(12) United States Patent
Katsumata et al.

(10) Patent No.: US 11,650,455 B2
(45) Date of Patent: May 16, 2023

(54) PLANAR LIGHT SOURCE

(71) Applicant: NICHIA CORPORATION, Anan (JP)

(72) Inventors: Toshinobu Katsumata, Fujiyoshida (JP); Toshiyuki Hashimoto, Anan (JP); Naoya Kashiwagi, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/869,682

(22) Filed: Jul. 20, 2022

(65) Prior Publication Data

US 2022/0357619 A1    Nov. 10, 2022

Related U.S. Application Data

(63) Continuation of application No. 17/331,479, filed on May 26, 2021, now Pat. No. 11,428,984.

(30) Foreign Application Priority Data

May 29, 2020 (JP) .............................. JP2020-095002
Dec. 15, 2020 (JP) .............................. JP2020-207548

(51) Int. Cl.
*G02F 1/13357*    (2006.01)

(52) U.S. Cl.
CPC .. *G02F 1/133603* (2013.01); *G02F 1/133606* (2013.01); *G02F 2201/56* (2013.01)

(58) Field of Classification Search
CPC ......... G02F 1/133603; G02F 1/133605; G02F 1/133606; G02F 1/133607;

(Continued)

(56) References Cited

U.S. PATENT DOCUMENTS 7,649,593 B2   1/2010  Yoon et al.
10,437,101 B2  10/2019 Sako et al.
(Continued)

FOREIGN PATENT DOCUMENTS

JP    2006-310319 A    11/2006
JP    2010-066664 A    3/2010
(Continued)

OTHER PUBLICATIONS

Non Final OA in the related U.S. Appl. No. 17/331,479, dated Feb. 3, 2022.

(Continued)

*Primary Examiner* — Britt D Hanley
(74) *Attorney, Agent, or Firm* — Global IP Counselors, LLP

(57) ABSTRACT

A planar light source includes a mounting substrate, a plurality of light sources, a partition member, a frame body, a wavelength conversion member, and a light diffusion plate. The light sources are arranged two-dimensionally on the mounting substrate in a plan view. The partition member includes a wall portion surrounding each of the light sources except for outermost ones of the light sources in the plan view. The wall portions are located inward of the outermost ones of the light sources. The frame body has a bottom portion and a lateral wall surrounding the mounting substrate. The wavelength conversion member is disposed on the lateral wall of the frame body. The light diffusion plate is disposed above the plurality of light sources and the wavelength conversion member.

10 Claims, 16 Drawing Sheets

(58) Field of Classification Search
CPC ......... G02F 1/133611; G02F 1/133614; G02F 2201/56; G02F 2202/28
See application file for complete search history.

(56) References Cited

U.S. PATENT DOCUMENTS

| | | |
|---|---|---|
| 10,698,259 B2 | 6/2020 | Son et al. |
| 2017/0122529 A1* | 5/2017 | Yamada ................ F21V 7/0083 |
| 2018/0080625 A1* | 3/2018 | Yamada ............ G02F 1/133606 |
| 2018/0149932 A1 | 5/2018 | Nakamura et al. |
| 2019/0146278 A1* | 5/2019 | Son ................... G02F 1/133606 349/64 |
| 2019/0187519 A1 | 6/2019 | Kim et al. |
| 2020/0285117 A1 | 9/2020 | Hashimoto et al. |

FOREIGN PATENT DOCUMENTS

| | | |
|---|---|---|
| JP | 2012-194473 A | 10/2012 |
| JP | 2012-221779 A | 11/2012 |
| JP | 2018-181630 A | 11/2018 |
| JP | 2019-070782 A | 5/2019 |
| JP | 2019-091036 A | 6/2019 |
| JP | 2019-197093 A | 11/2019 |
| KR | 10-2008-001835 A | 1/2008 |
| WO | WO-2018124012 A1 * | 7/2018 ................ F21S 2/00 |

OTHER PUBLICATIONS

Notice of Allowance in the related U.S. Appl. No. 17/331,479, dated Apr. 21, 2022.

* cited by examiner

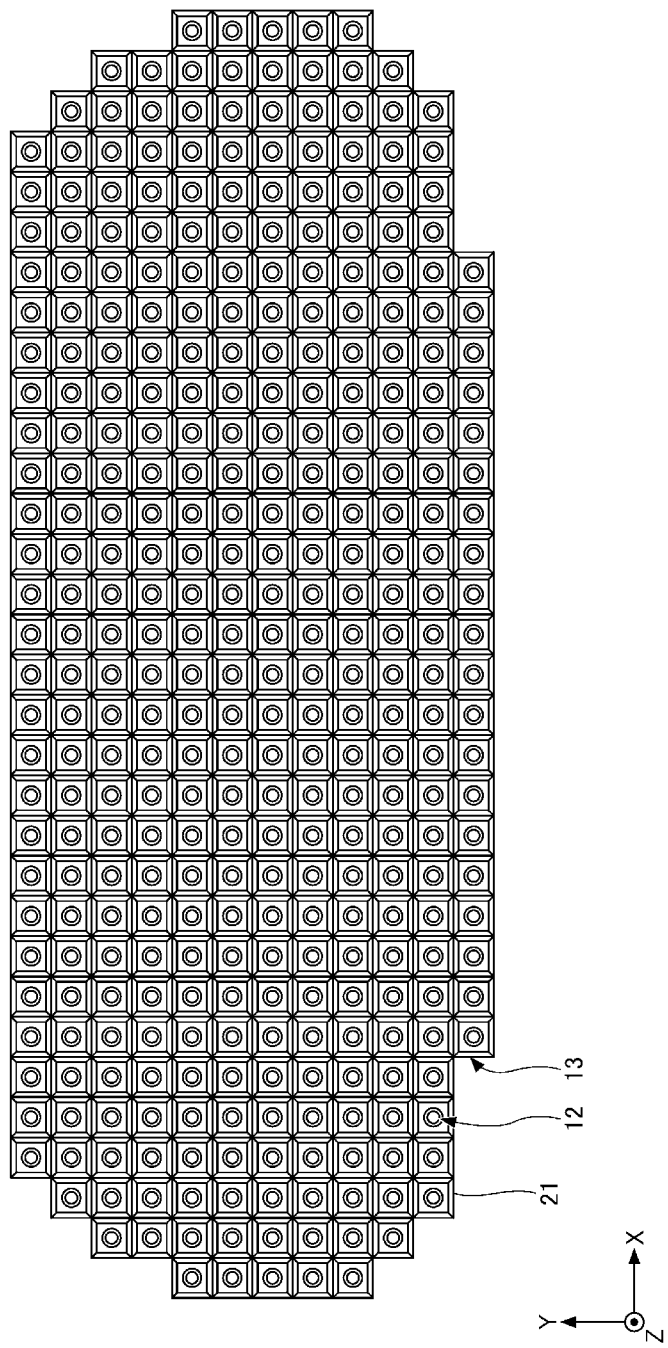

PLANAR LIGHT SOURCE

CROSS-REFERENCE TO RELATED APPLICATIONS

This application is a continuation application of U.S. patent application Ser. No. 17/331,479, filed on May 26, 2021. This application claims priority to Japanese Patent Application No. 2020-95002 filed on May 29, 2020, and Japanese Patent Application No. 2020-207548 filed on Dec. 15, 2020. The entire disclosures of U.S. patent application Ser. No. 17/331,479 and Japanese Patent Application No. 2020-95002 and Japanese Patent Application No. 2020-207548 are hereby incorporated herein by reference.

BACKGROUND

Technical Field

The present disclosure relates to a planar light source and a liquid crystal display device.

Background Art

Planar light sources using light emitting elements such as light emitting diodes are widely used for various light sources such as a backlight for a liquid crystal display device and a display device.

An example of such a planar light source has a configuration including light emitting elements arranged two-dimensionally and a light diffusion plate disposed above the light emitting elements. For example, see JP 2012-221779 A. In a planar light source described in JP 2012-221779 A, the light diffusion plate contains diffusion particles for diffusing light emitted from light emitting portions of the light emitting elements. In this light diffusion plate, protrusions with a gentle curved surface shape protruding toward the light emitting elements are integrally formed at least in areas corresponding to the light emitting portions of the light emitting elements in a surface of the light diffusion plate proximate to the light emitting elements.

SUMMARY

An object of the present disclosure is to reduce unevenness in brightness generated at a peripheral region of a planar light source having an irregular planar shape.

A planar light source according to an embodiment of the disclosure includes a mounting substrate, a plurality of light sources, a partition member, a frame body, a wavelength conversion member, and a light diffusion plate. The light sources are arranged two-dimensionally on the mounting substrate in a plan view. The partition member includes a wall portion surrounding each of the light sources except for outermost ones of the light sources in the plan view. The wall portions are located inward of the outermost ones of the light sources. The frame body has a bottom portion and a lateral wall surrounding the mounting substrate. The wavelength conversion member is disposed on the lateral wall of the frame body. The light diffusion plate is disposed above the plurality of light sources and the wavelength conversion member.

A planar light source according to an embodiment of the disclosure includes a mounting substrate, a plurality of light sources, a frame body, a wavelength conversion member, and a light diffusion plate. The light sources are arranged two-dimensionally on the mounting substrate in a plan view. The frame body has a bottom portion and a lateral wall surrounding the mounting substrate. The wavelength conversion member is disposed on the lateral wall of the frame body. A distance between the wavelength conversion member and an outermost light source among the plurality of light sources is greater than a distance between two light sources among the plurality of light sources. The light diffusion plate is disposed above the plurality of light sources and the wavelength conversion member.

According to one embodiment of the disclosure, unevenness in brightness generated at a peripheral region can be reduced in a planar light source having an irregular planar shape.

BRIEF DESCRIPTION OF DRAWINGS

FIG. 19 is a schematic plan view explaining an outer shape of a substrate in a planar light source according to a third modified example of the first embodiment.

DESCRIPTION OF EMBODIMENTS

Figure 1:
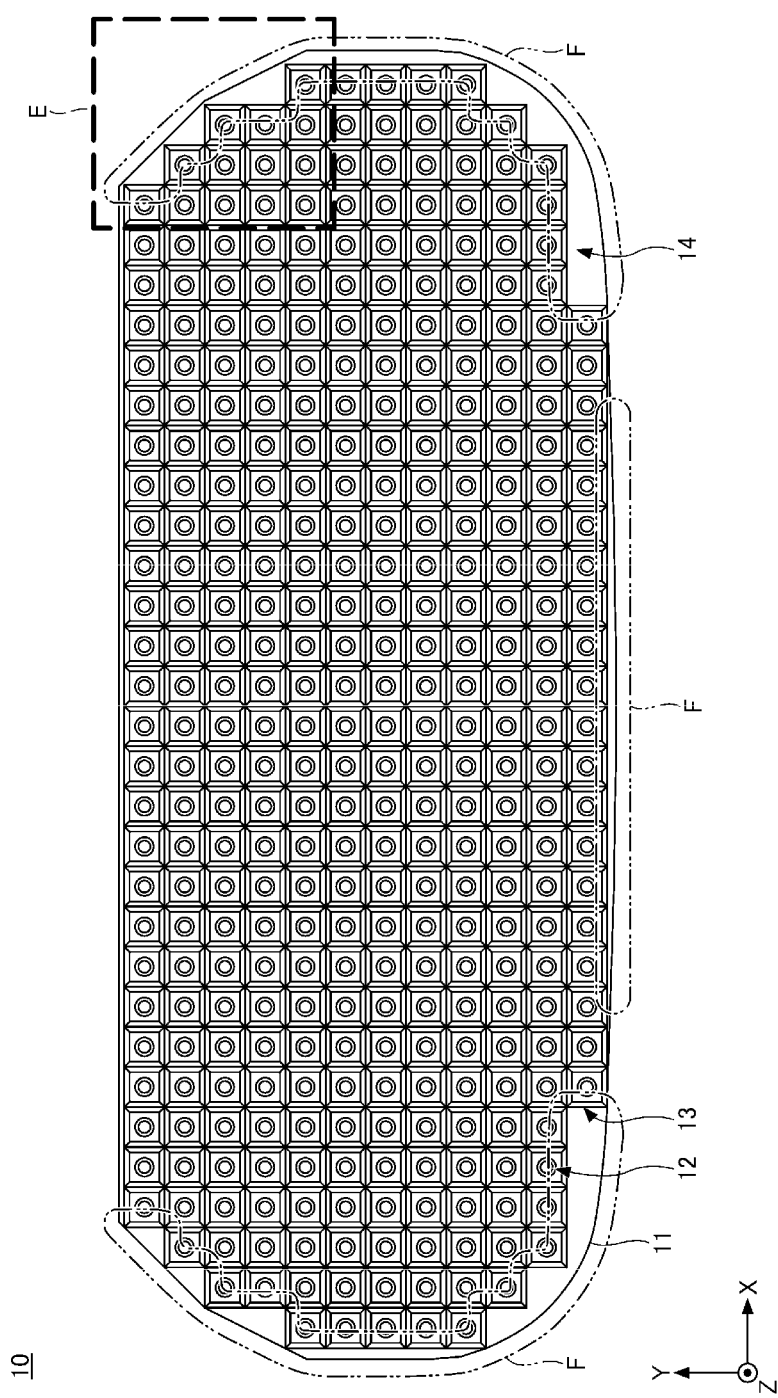
FIG. 1 is a schematic plan view illustrating a planar light source according to a first embodiment.

Hereinafter, certain embodiments of the present invention will be described with reference to the drawings. In the description below, terms indicating a specific direction or position (e.g., "upper", "lower", and other terms including those terms) are used when necessary. The use of those terms is to facilitate understanding of the invention with reference to the drawings, and the technical scope of the invention is not limited by the meaning of those terms. In addition, parts designated with the same reference numerals appearing in a plurality of drawings indicate identical or equivalent parts or members.

Further, the embodiments to be illustrated below exemplify planar light sources for embodying the technical concept of the present invention, and do not limit the present invention to the description below. In addition, unless otherwise specified, the dimensions, materials, shapes, relative arrangements, and the like of constituent elements described below are not intended to limit the scope of the present invention to those, but are intended to be exemplified. Also, the contents described in one embodiment can be applied to another embodiment and modified examples. Further, the size, positional relationship, and the like of the members illustrated in the drawings can be exaggerated in order to clarify the explanation.

First Embodiment

Planar Light Source 10

Figure 2:
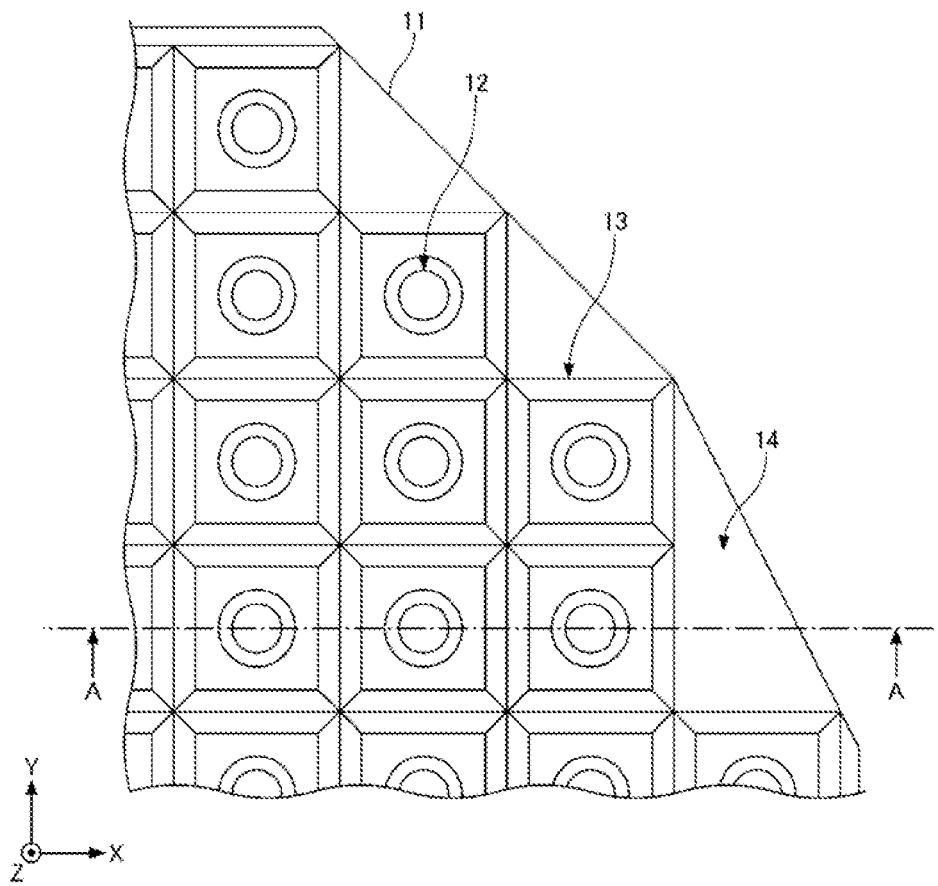
FIG. 2 is a schematic partially enlarged plan view of part B of FIG. 1.
Figure 3:
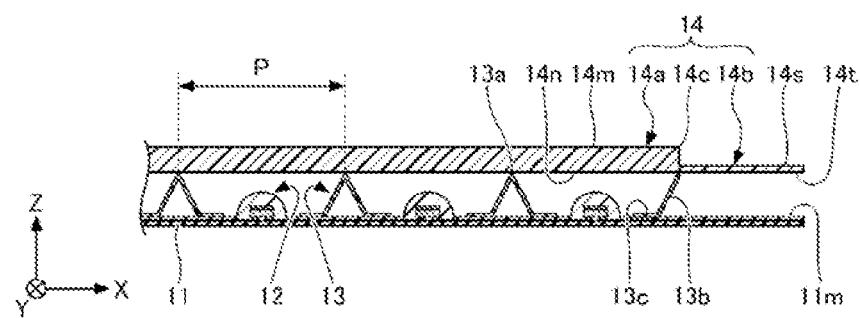
FIG. 3 is a cross-sectional view taken along line A-A of FIG. 2.
Figure 4:
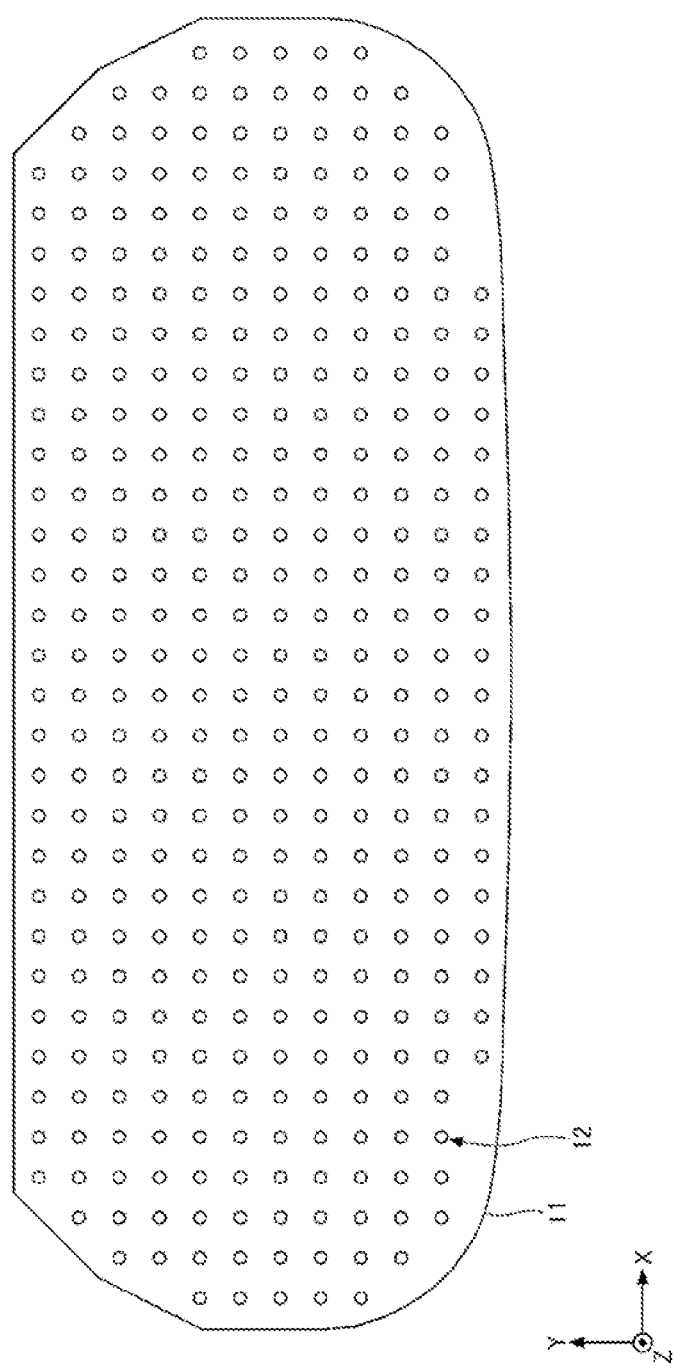
FIG. 4 is a schematic plan view illustrating the arrangement of the light sources in the planar light source according to the first embodiment.
Figure 5:
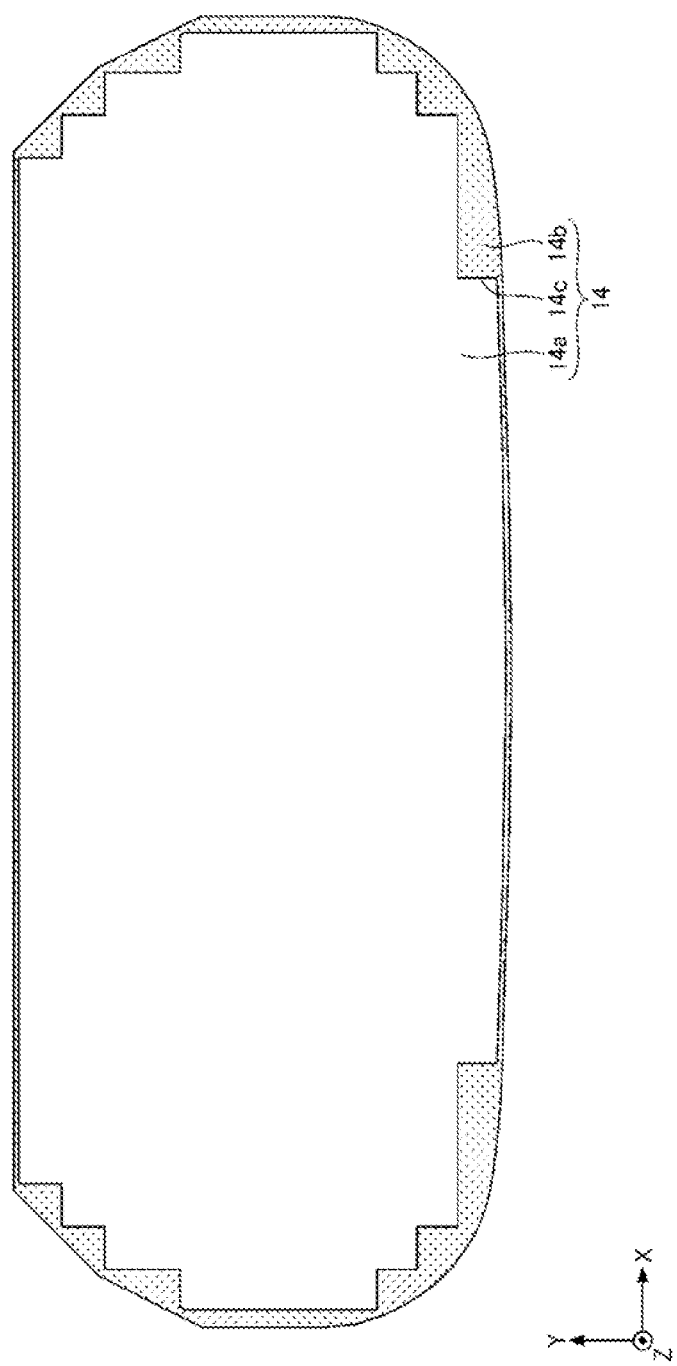
FIG. 5 is a schematic plan view illustrating a light diffusion plate in the planar light source according to the first embodiment.
Figure 6:
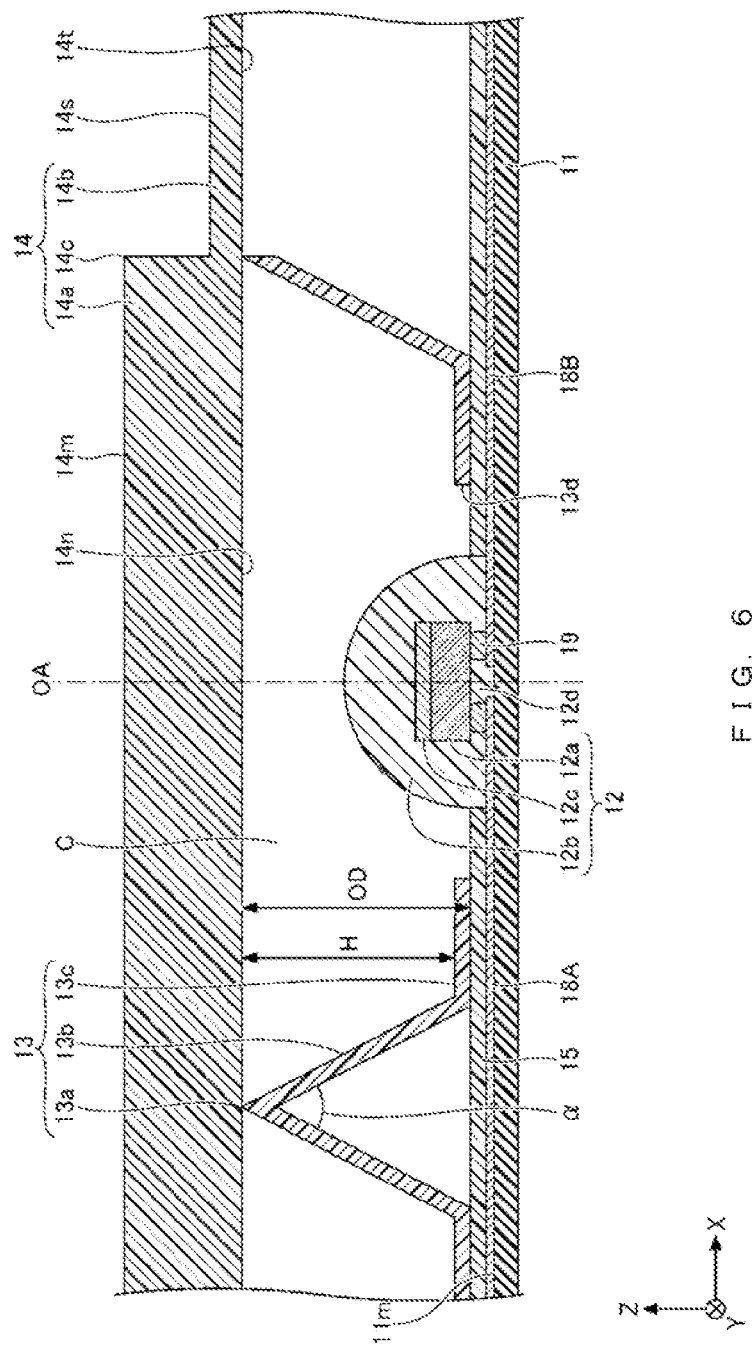
FIG. 6 is a partially enlarged cross-sectional view of the vicinity of the light source of FIG. 3.

FIG. 1 is a schematic plan view illustrating a planar light source according to a first embodiment. FIG. 2 is a schematic partially enlarged plan view of part E of FIG. 1. FIG. 3 is a cross-sectional view taken along line A-A of FIG. 2. FIG. 4 is a schematic plan view illustrating an arrangement of light sources in the planar light source according to the first embodiment, and is a view in which a partition member and a light diffusion plate in FIG. 1 are not illustrated. FIG. 5 is a schematic plan view illustrating the light diffusion plate in the planar light source according to the first embodiment. FIG. 6 is a partially enlarged cross-sectional view of the vicinity of the light source of FIG. 3.

As illustrated in FIGS. 1 to 6, a planar light source 10 is a surface-emitting light emitting device including a substrate 11, light sources 12, a partition member 13, and a light diffusion plate 14. In FIGS. 1 and 2, the structures under the light diffusion plate 14 (i.e., the substrate 11, the light sources 12, and the partition member 13) are illustrated with solid lines in order to better show these structures. The partition member 13 is not an essential component of the planar light source 10, but is provided when necessary. When the partition member 13 is not provided, for example, a supporting body that supports the light diffusion plate 14 can be provided.

In the description below, the term "in a plan view" refers to viewing a target object in the normal direction to an upper surface 11m of the substrate 11, and the term "planar shape" refers to the shape of the target object viewed in the normal direction to the upper surface 11m of the substrate 11.

A plurality of light sources 12 each including a light emitting diode are arranged on the substrate 11, which is a mounting substrate. Any appropriate number of light sources 12 can be disposed on the substrate 11.

The partition member 13 is disposed on the same side as the light sources 12 of the substrate 11. The partition member 13 has a top portion 13a disposed in a grid pattern in a plan view, and a wall portion 13b surrounding each of the light sources 12 in a plan view, and includes a plurality of regions each surrounding a corresponding one of the light sources 12. The wall portion 13b of the partition member 13, for example, extends from the top portion 13a toward the substrate 11. In a cross-sectional view, each space surrounded by corresponding portions of the wall portion 13b that are opposite to each other has a width reduced toward the substrate 11.

A region surrounded by corresponding portions of the wall portion 13b (that is, the area and the space) is defined as a single section C, so that the partition member 13 includes a plurality of sections C. In the present embodiment, a single light source 12 is disposed in a single section C. However, two or more light sources 12 can be disposed in a single section C. In this case, for example, three light sources 12 of red, green, and blue can be disposed in a single section C. Alternatively, two light sources 12 of a daylight color and a bulb color can be disposed in a single section C.

The light diffusion plate 14 is an optical member disposed on the top portion 13a of the partition member 13 and disposed above the light source 12. With the light diffusion plate 14, the planar light source 10 can have improved the uniformity of light. The light diffusion plate 14 according to the present embodiment has a portion having a thin thickness on a peripheral region in order to reduce unevenness in brightness on the peripheral region of the planar light source 10.

The outermost contour portion of each member in a plan view is referred to as an "outer edge", and an area having a width and including the outer edge in a plan view is referred to as a peripheral region. In particular, the term "peripheral region of the light diffusion plate 14" refers to an area of the light diffusion plate 14 located outward of peripheral light sources 12 (outermost light sources) of the plurality of light sources 12 in a plan view. The peripheral region does not necessarily represent an annular region.

Hereinafter, components constituting the planar light source 10 will be described in detail.

Substrate 11

The substrate 11 is a member on which the plurality alight sources 12 are arranged, and has an irregular shape. The term "irregular shape" as used herein refers to a shape other than a rectangular shape, such as a non-rectangular shape partially or entirely modified from a perfect rectangular shape in order to correspond to a predetermined product shape.

As illustrated in FIG. 6, conductor wirings 18A and 18B for supplying electric power to the light sources 12 such as the light emitting elements 12a are disposed on the upper surface 11m of the substrate 11. Portions of the conductor wirings 18A and 18B that are not to be electrically connected to the light emitting elements 12a are preferably covered with a covering member 15.

The material of the substrate 11 can be any appropriate material that can insulate at least between a pair of conductor wirings 18A and 18B, and examples thereof include ceramics, resins, and composite materials. Examples of the ceramics include alumina, mullite, forsterite, glass ceramics, nitride-based ceramics (e.g., AlN), carbide-based ceramics (e.g, SiC), and LTCC. Examples of the resin include phenol resin, epoxy resin, polyimide resin, BT resin, polyphthalamide (PPA), and polyethylene terephthalate (PET), Examples of the composite material include the resins described. above with an inorganic filler such as glass fiber, $SiO_2$, $TiO_2$, or $Al_2O_3$ mixed in the resins, a glass fiber reinforced resin (glass epoxy resin), and a metal substrate having an insulating layer formed on the metal member.

The thickness of the substrate 11 can be appropriately selected. The substrate 11 can be either a flexible substrate that can be manufactured in roll-to-roll processing or a rigid substrate. The rigid substrate can be a bendable thin rigid substrate. For the conductor wirings 18A and 18B, any appropriate material can be used as long as it is a conductive member, and a material commonly used for a wiring layer of a circuit board or the like can be used. A plating film, a light reflecting film, or the like can be formed on surfaces of the conductor wirings 18A and 18B.

The covering member 15 is preferably formed of an insulating material. Examples of the material of the covering member 15 include the same materials as those described above as examples of the material of the substrate 11. Using the resin described above containing white filler or the like for the covering member 15 allows the light emitted from the light source 12 to be reflected at the covering member 15, so that the light extraction efficiency of the planar light source 10 can be improved.

Light Source 12

The plurality of light sources 12 are disposed two-dimensionally in a first direction and in a second direction perpendicular to the first direction, on the substrate 11 in a plan view. More specifically, as shown in, for example, FIG. 1, the light sources 12 are arranged in a plurality of first arrays of the light sources each extending along the first direction and a plurality of second arrays of the light sources each extending along the second direction perpendicular to the first direction in the plan view. The first direction and the second direction are, for example, the X direction and the Y direction of FIG. 1, etc.

The light source 12 is a member configured to emit light, and examples of the light source 12 include a light emitting element configured to emit light, a light emitting element sealed with a light-transmissive resin or the like, and a surface-mounted light emitting device (which may also be referred to as an LED) in which the light emitting element is packaged. Examples of the light source 12 include, as illustrated in FIG. 6, the light emitting element 12a covered by a sealing member 12b. A single light emitting element 12a can be used for the light source 12, but a plurality of light emitting elements can be used for the single light source 12. Further, the light source 12 can have a configuration including a resin containing a light-reflective material and surrounding lateral surfaces of the light emitting element, and a light-transmissive member that covers an upper surface of the light emitting element and an upper surface of the resin containing the light-reflective material. The light source 12 can have a configuration including a light-transmissive member covering the upper surface of the light emitting element and a resin containing a light-reflective material and surrounding the lateral surfaces of the light emitting element and lateral surfaces of the light-transmissive member. The light-transmissive member in an example herein can contain a phosphor. A light-transmissive bonding member that adheres the light emitting element and the light-transmissive member can be disposed between the light emitting element and the light-transmissive member.

The light source 12 can have any appropriate light distribution characteristics, but preferably has a wide light distribution in order to illuminate in each section C surrounded by corresponding portions of the wall portion 13b of the partition member 13 with less unevenness in brightness. In particular, each of the light sources 12 preferably has batwing light distribution characteristics. With such a light distribution, the amount of light to be emitted directly above the light source 12 can be reduced, and the light distribution of each of the light sources 12 can be spread, and the wall portion 13b and bottom portions 13c can be irradiated with the spread light, so that unevenness in brightness in each of the sections C surrounded by corresponding portions of the wall portion 13b can be reduced.

As used herein, the batwing light distribution characteristics are defined as characteristics having a light emission intensity distribution in which the light emission intensity at light distribution angles with an absolute value greater than 0° is greater than that at 0°, where an angle of an optical axis OA is 0°. The optical axis OA is defined by a line passing through the center of the light source 12 and perpendicularly intersecting the upper surface 11m of the substrate 11, as illustrated in FIG. 6.

In particular, as illustrated in FIG. 6, an example of the light source 12 having the batwing light distribution characteristics includes the light emitting element 12a including a light reflecting film 12c on an upper surface thereof. With the light reflecting film 12c disposed on the upper surface of the light emitting element 12a, most of the upward light from the light emitting element 12a is reflected at the light reflecting film 12c to reduce the amount alight directly above the light emitting element 12a, so that the batwing light distribution characteristics can be obtained. The light reflecting film 12c can be disposed directly on the light emitting element 12a, so that it is not necessary to separately combine a special lens for the batwing light distribution, which allows for reducing a thickness of the light source 12.

The light reflecting film 12c can be a metal film made of silver or copper, a resin containing white filler or the like, a combination thereof, or the like. Alternatively, the light reflecting film 12c can be an organic multilayer film (DBR film) and can have an incident angle dependence of reflectance for the emission wavelength of the light emitting element 12a. More specifically, the reflectance of the light reflecting film 12c is preferably set to be lower in the oblique incidence than in the vertical incidence. With such a reflectance, variation in the brightness immediately above the light emitting element 12a can be gradual, and it is possible to prevent the area immediately above the light emitting element 12a from being excessively dark, e.g., becoming a dark spot.

For the light source 12, for example, the light emitting element 12a mounted directly on the substrate 11 has a height in a range of 100 μm to 500 μm. The light reflecting film 12c can have a thickness in a range of 0.1 μm to 3.0 μm. Even when the sealing member 12b is included, the light source 12 can have a thickness approximately in a range of 0.5 mm to 2.0 mm.

The plurality of light sources 12 are preferably wired on the substrate 11 such that the plurality of light sources 12 can be driven separately from each other and dimming control (e.g., local dimming or high dynamic range) can be performed for each light source 12.

Light Emitting Element 12a

A known light emitting element can be used for the light emitting element 12a. For example, a light emitting diode is preferably used for the light emitting element 12a. A light emitting element having any appropriate wavelength can be selected for the light emitting element 12a. For example, for a blue or green light emitting element, a light emitting element using a nitride-based semiconductor such as GaN, InGaN, AlGaN, and AlInGaN can be used. For a red light emitting element, GaAlAs, AlInGaP, and the like can be used. A semiconductor light emitting element made of a material other than these can also be used. The composition, light emission color, size, number, and the like of the light emitting elements to be used can be appropriately selected according to the purpose.

As illustrated in FIG. 6, the light emitting element 12a can be flip-chip mounted straddling a pair of positive and negative conductor wirings 18A and 18B on the upper surface 11m of the substrate 11 using bonding members 19 disposed between the light emitting element 12a and the substrate 11. Alternatively, the light emitting element 12a can be face-up mounted instead of being flip-chip mounted.

The bonding member 19 is a member for securing the light emitting element 12a to the substrate or the conductor wirings, and examples thereof include an insulating resin and a conductive member. In a case of flip-chip mounting as illustrated in FIG. 6, a conductive member is used. Specific examples thereof include Au-containing alloys, Ag-containing Pd-containing alloys, In-containing alloys, Pb-Pd-containing alloy, Au—Ga-containing alloys, Au—Sn-containing alloys, Sn-containing alloys, Sn—Cu-containing alloys, Sn-Cu-Ag-containing alloys, Au—Ge-containing alloys, Au—Si-containing alloys, Al-containing alloys, Cu—In containing alloys, and mixtures of metals and fluxes.

Sealing Member 12b

The sealing member 12b covers the light emitting element 12a for the purpose of protecting the light emitting element 12a from the external environment, optically controlling the light to be emitted from the light emitting element 12a (for example, obtaining the batwing light distribution characteristics), and the like. For the sealing member 12b, a light-transmissive material is used. Examples of a material of the sealing member 12b include a light-transmissive resin such as an epoxy resin, a silicone resin, or a resin obtained by mixing them, glass, and the like, Of these, the silicone resin is preferably used in consideration of light resistance and ease of molding. The sealing member 12b can contain a diffusing agent for diffusing light from the light emitting element 12a, a coloring agent corresponding to the light emitting color of the light emitting element 12a, and the like. For the diffusing agent, the coloring agent, and the like, those known in the art can be employed.

The sealing member 12b can be in direct contact with the substrate 11. The sealing member 12b is adjusted to have a viscosity that allows printing, coating with a dispenser, and the like, and can be cured by heat treatment or light irradiation. Examples of the shape of the sealing member 12b include a substantially hemispherical shape, a vertically elongated protruding shape in a cross-sectional view, a flat protruding shape in a cross-sectional view, and a circular shape or an elliptical shape in a plan view. As used herein, the term "vertically long protruding shape" refers to a shape, in a cross-sectional view, in which the maximum length in the direction perpendicular to the upper surface 11m of the substrate 11 is greater than the maximum length in the direction parallel to the upper surface urn of the substrate 11. Further, the term "flat protruding shape" as used herein refers to a shape, in a cross-sectional view, in which the maximum length in the direction parallel to the upper surface 11m of the substrate 11 is greater than the maximum length in the direction perpendicular to the upper surface 11m of the substrate 11. The sealing member 12b can be disposed to serve as an underfill 12d between the lower surface of the light emitting element 12a and the upper surface 11m of the substrate 11.

Partition Member 13

The wall portion 13b of the partition member 13 can be in a grid pattern in a plan view. In a plan view, the boundary between adjacent sections C can be regarded as the top portion 13a. The partition member 13 preferably includes the bottom portions 13c connected to the lower end of the wall portion 13b in respective sections C. In other words, in the partition member 13, it is preferable that each section C is constituted by a corresponding one of the bottom portions 13c and corresponding portions of the wall portion 13b. Peripheral ones of the bottom portions 13c can extend to the peripheral region of the substrate 11 in a plan view. In this case, the peripheral bottom portions 13c can be located closer to the outer edge of the substrate 11 than peripheral portions of the wall portion 13b. The peripheral region of the partition member 13 can have a portion that overlaps with the peripheral region of the substrate 11. The partition member 13 is preferably a reflective member.

The partition member 13 includes, for example, a through hole 13d in which the light source 12 is disposed at substantially the center of the bottom portion 13c in the section C. As illustrated in FIG. 6, the light source 12 is preferably disposed in the through hole 13d. The through hole 13d can have any appropriate shape and size that allows the entire light source 12 to be exposed, and the outer edge of the through hole 13d is preferably set to be located only in the vicinity of the light source 12. With this structure, when the partition member 13 has light-reflectivity, the light from the light source 12 can be reflected also at the bottom portion 13c, so that the light extraction efficiency can be improved.

The top portion 13a is a portion of the wall portion 13b located at the greatest height. The top portion 13a can be a flat surface, but the vicinity of the top portion 13a preferably has a ridge shape. That is, the vertical cross section of a portion of the wall portion 13b constituting the top portion 13a preferably forms an acute-angled triangle, and more preferably an acute-angled isosceles triangle.

An acute angle of the acute-angled triangle or the acute-angled isosceles triangle that is an angle of the wall portion 13b at the top portion 13a ($\alpha$ in FIG. 6) is preferably in a range of 60° to 90°, for example. With such a range, the space and area occupied by the partition member 13 can be reduced, and the height of the partition member 13 can be reduced, so that size and thickness of the planar light source 10 can be reduced.

A pitch P, which is an interval between the opposite portions of top portion 13a of the partition member 13, can be appropriately adjusted according to the size of the light source to be used, the intended size and performance of the planar light source, and the like. The pitch P can be, for example, in a range of 1 mm to 50 mm, preferably in a range of 5 mm to 20 mm, and more preferably in a range of 6 mm to 15 mm. In each section C, surfaces of the wall portion 13b on the section C side inclined spreading upwardly from the bottom portion 13c and the vicinity of the upper surface 11m of the substrate 11 can constitute corresponding portions of the wall portion 13b that surround a corresponding light source 12.

In addition, the partition member 13 preferably has a height, that is, a length between the lower surface of the bottom portion 13c and the top portion 13a of 8 mm or less, and when a thinner planar light source is configured, preferably in a range of approximately 1 mm to 4 mm. Further, the distance between the lower surface of the bottom portion 13c of the partition member 13 and the light diffusion plate 14 is preferably approximately 8 mm or less, and when a thinner planar light source is configured, the distance is preferably in a range of approximately 2 mm to 4 mm. Accordingly, a thickness of the backlight unit including the optical member such as the light diffusion plate 14 can be greatly reduced. The partition member 13 can have a thickness, for example, in a range of 100 μm to 300 μm.

The shape of each section C formed by corresponding portions of the partition member 13 surrounding the light source 12, that is, the shape of each of regions demarcated by the wall portion 13b can be a quadrangular shape in a plan view, or any other appropriate shapes. For example, the shape of the section C can be circular, elliptical, or the like. In order to efficiently dispose the plurality of light sources 12, a polygonal shape such as a triangular shape, a quadrangular shape, or a hexagonal shape is preferable. This allows for facilitating demarcating the light emitting area into any number of regions by the wall portion 13b according to the area dimension of the light emitting surface of the planar light source 10, and the light emitting area can be disposed at a high density.

The number of sections C demarcated by the wall portion 13b can be set to any appropriate number, and the shape and arrangement of the wall portion 13b, the number of sections C, and the like can be changed according to the desired size of the planar light source. According to the number and positions of the light sources 12 disposed on the substrate 11 in a plan view, the partition member 13 can have various shapes, for example, the shapes in which three sections C are adjacent to each other and three end portions of the top portion meet at one point, four sections C are adjacent to each other and four end portions of the top portion meet as illustrated in FIG. 2, and six sections C are adjacent to each other and six end portions of the top portion meat at one point. When the four sections C are adjacent to each other and the four end portions of the top portion meet, the section C has a quadrangular shape in a plan view is.

The partition member 13 is preferably disposed on the substrate 11, and the lower surface of the bottom portion 13c of the partition member 13 and the upper surface 11m of the substrate 11 are preferably secured to each other. In particular, these are preferably secured at the periphery of the through hole 13d using a light-reflective adhesive member so that the light emitted from the light source 12 does not enter a space between the substrate 11 and the partition member 13. For example, the light-reflective adhesive member is more preferably disposed in a ring shape along the outer periphery of the through hole 13d. The adhesive member can be a double-sided tape, a hot melt adhesive sheet, or a resin-based adhesive such as a thermosetting resin, a thermoplastic resin, or the like. These adhesive members preferably have high flame resistance. However, the partition member 13 can be secured on the substrate 11 by screwing or the like.

As described above, the partition member 13 preferably has the light reflectivity. This allows light emitted from the light source 12 to be efficiently reflected at the wall portion 13b and the bottom portion 13c. In particular, when the wall portion 13b has the inclination as described above and is irradiated with the light emitted from the light source 12, the light can be reflected upward. Thus, when the light is not emitted in an adjacent section C, the contrast ratio can be further improved. Further, the light can be reflected upward more efficiently.

The partition member 13 can be obtained by molding a resin or the like containing a reflective material composed of metal oxide particles made of titanium oxide, aluminum oxide, silicon oxide or the like, or by molding a resin containing no reflective material and then disposing a reflective member on a surface of the molded resin. Alternatively, a resin containing a plurality of fine bubbles can be used for partition member 13. In this case, light is reflected at the interface of the bubbles. Further, examples of the resin to be used for the partition member 13 include a thermoplastic resin such as an acrylic resin, a polycarbonate resin, a cyclic polyolefin resin, polyethylene terephthalate (PET), or polyester, and a thermosetting resin such as epoxy or silicone. The partition member 13 is preferably set to have a reflectance of 70% or greater to the light emitted from the light source 12.

The partition member 13 can be formed by using a molding technique using a mold, a molding technique using stereolithography, or the like. For the molding technique using the mold, molding techniques such as injection molding, extrusion molding, compression molding, vacuum forming, pressure forming, and press forming can be employed. For example, the partition member 13 in which the bottom portions 13c and the wall portion 13b are integrally formed can be formed by vacuum forming using a reflective sheet formed of PET or the like.

Light Diffusion Plate 14

The light diffusion plate 14 is a member having an irregular shape that diffuses and transmits incident light, and one light diffusion plate 14 can be disposed above the plurality of light sources 12. The light diffusion plate 14 is preferably a flat plate-shaped member, but may alternatively have protrusions and/or recesses in a surface thereof. The light diffusion plate 14 is preferably disposed substantially parallel to the substrate 11.

When the pitch between the portions of the top portion 13a of the partition member 13 is P [mm], the light diffusion plate 14 is preferably disposed so that a distance OD between the light diffusion plate 14 and the light source 12 is, for example, 0.3P [mm] or less, and more preferably 0.25P [mm] or less. As used herein, as illustrated in FIG. 6, the distance OD refers to a distance between the outermost surface of the substrate 11 (that is, when the substrate 11 has a coating layer, wiring layer, or the like at a surface thereof, the outermost surface of the coating layer, wiring layer, or the like) and the lower surface of the light diffusion plate 14. From another perspective, the light diffusion plate 14 is preferably disposed such that a distance H between the light diffusion plate 14 and the upper surface of the bottom portion 13c of the partition member 13, illustrated in FIG. 6, is in a range of 1.5 mm to 5 mm, more preferably in a range of 2 mm to 3 mm.

The light diffusion plate 14 can be made of a material having low light absorption for visible light, such as a polycarbonate resin, a polystyrene resin, an acrylic resin, or a polyethylene resin. To diffuse the incident light, a surface of the light diffusion plate 14 can have protrusions and recesses, or a material having a refractive index different from that of a base material of the light diffusion plate 14 can be dispersed in the light diffusion plate 14. The protrusions and recesses can be made, for example, in a size of 0.01 mm to 0.1 mm. For the material having the different refractive index, for example, a polycarbonate resin, an acrylic resin, or the like can be selected to be used.

A thickness of the light diffusion plate 14 and the degree of light diffusion of the light diffusion plate 14 can be appropriately set, and commercially available members such as a light diffusion sheet or a diffuser film can be used for the light diffusion plate 14. For example, the thickest portion of the light diffusion plate 14 can have a thickness in a range of 1 mm to 2 mm.

In the planar light source 10, with the substrate 11 having an irregular shape, when as many light sources 12 as possible are disposed on the substrate 11 while maintaining the matrix arrangement in the first direction and the second direction, a region on which no light source 12 is disposed may be generated on the substrate 11 near the outer periphery of the substrate 11. Then, if no measures are taken, the peripheral region of the planar light source 10 (for example, the area between the outermost periphery of the partition member 13 and the outer edge of the light diffusion plate 14) would become a dark portion, and the peripheral region of the planar light source may have unevenness in brightness. In FIG. 1, for example, the dark portions would be noticeable in regions surrounded by the long dashed double-short dashed lines F. That is, if no measures are taken, unevenness in brightness will occur in a part of the peripheral region of the planar light source 10. In view of this, in the planar light source 10, a part of the peripheral region of the light diffusion plate 14 is thinner than the central side of the light diffusion plate 14 to reduce the occurrence of unevenness in brightness. When necessary, the entire peripheral region of the light diffusion plate 14 can be thinner than the central side of the light diffusion plate 14. Hereinafter, the shape of the light diffusion plate 14 will be described in detail.

The light diffusion plate 14 includes a thick plate portion 14a and a thin plate portion 14b having a thinner thickness than the thick plate portion 14a, and the thick plate portion 14a and the thin plate portion 14b are disposed adjacent to each other and integrally formed as a single body. In FIG. 5, for convenience, the thick plate portion 14a is illustrated in white and the thin plate portion 14b is illustrated in a dot pattern. The light diffusion plate 14 can be constituted by a single piece, or can be constituted by two or more layers. When the light diffusion plate 14 is constituted by two layers, for example, a second layer having a width narrower than that of the first layer can be provided on the first layer that is located closer to the substrate. In this structure, a region where the second layer is disposed on the first layer can serve as the thick plate portion 14a, and a region where the second layer is not disposed on the first layer can serve as the thin plate portion 14b.

A boundary 14c between the thick plate portion 14a and the thin plate portion 14b is located, for example, at a position facing peripheral portions of the wall portion 13b of the partition member 13. With this structure, on an outer peripheral side with respect to the peripheral portions of the wall portion 13b of the partition member 13, the frequency of light diffusion can be reduced and the amount of light transmitted through the thin plate portion 14b can be increased. This can result in a reduction in the occurrence of unevenness in brightness at the peripheral region of the planar light source 10. The boundary 14c can be located at a position facing the peripheral portions of the top portion 13a of the partition member 13.

When the wail portion 13b is located at a position directly below the boundary between the thick plate portion 14a and the thin plate portion 14b of the light diffusion plate 14 (FIG. 3) or its vicinity, a light emitted from the light source 12 toward the thin plate portion 14b of the light diffusion plate 14 is diffused in the thick plate portion 14a of the light diffusion plate 14, and then a portion of the diffused light is incident on the thin plate portion 14b. With a smaller thickness of the thin plate portion 14b, the light incident on the thin plate portion 14b is diffused at less frequency. Accordingly, the light extraction in the thin plate portion 14b is improved.

The thin plate portion 14b preferably has a thickness 0.5 times or less the thickness of the thick plate portion 14a. With such a thickness, the amount of light extracted from the area of the thin plate portion 14b increases, so that the occurrence of unevenness in brightness at the peripheral region of the planar light source 10 can be reduced.

A lower surface 14n of the thick plate portion 14a (a surface on the light source 12 side) and a lower surface 14t of the thin plate portion 14b (a surface on the light source 12 side) are in the same plane, and an upper surface 14m of the thick plate portion 14a (a surface opposite to the surface on the light source 12 side) and an upper surface 14s of the thin plate portion 14b (a surface opposite to the surface on the light source 12 side) are located at positions different in the height direction.

That is, the height from the upper surface 11m of the substrate 11 to the lower surface 14t of the thin plate portion 14b is the same as the height from the upper surface 11m of the substrate 11 to the lower surface 14n of the thick plate portion 14a. On the other hand, the height from the upper surface 11m of the substrate 11 to the upper surface 14s of the thin plate portion 14b is smaller than the height from the upper surface 11m of the substrate 11 to the upper surface 14m of the thick plate portion 14a.

The thin plate portion 14b is located in at least a part of the peripheral region of the light diffusion plate 14 in a plan view. As illustrated in FIG. 5, in the present embodiment, as an example, the thin plate portion 14b is provided over the entire peripheral region of the light diffusion plate 14 (the portion indicated by the dot pattern). With the thin plate portion 14b is provided over the entire peripheral region of the light diffusion plate 14, the brightness of the entire peripheral region of the light diffusion plate 14 can be increased, so that the unevenness in brightness can be reduced. Alternatively, a structure in which the thin plate portion 14b is located only in a part of the peripheral region of the light diffusion plate 14 may be employed.

Figure 7:
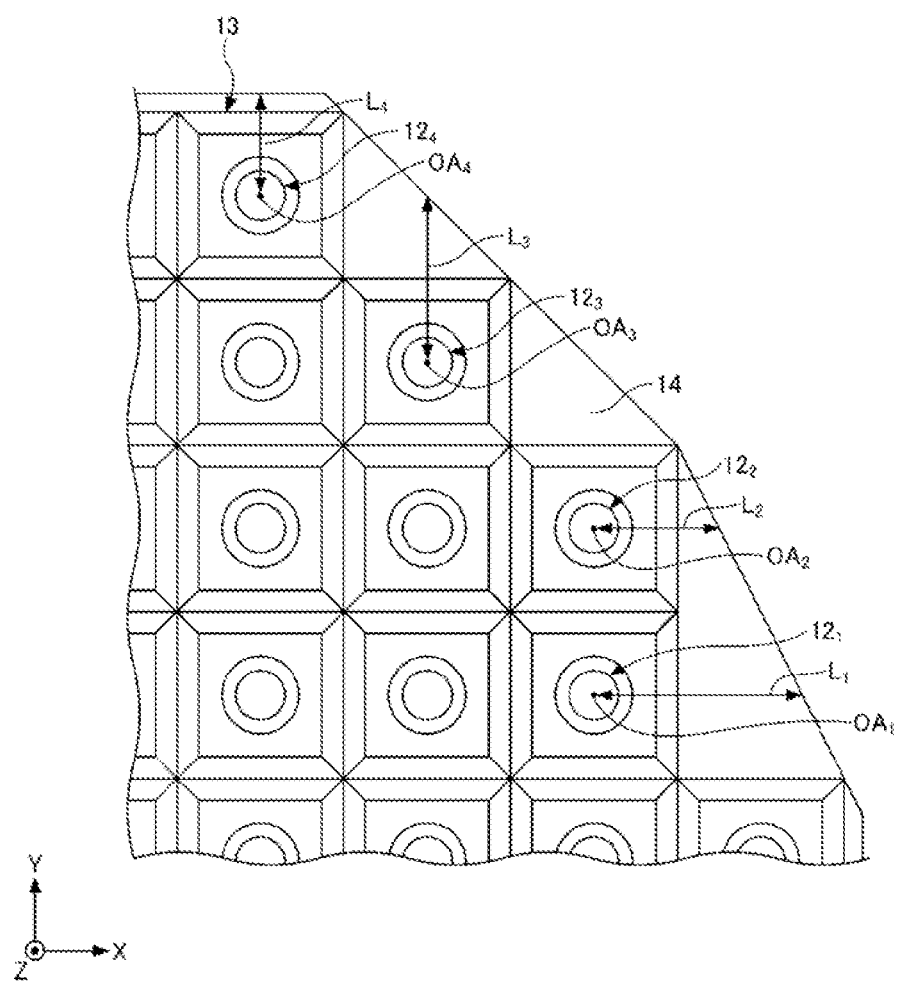
FIG. 7 is a schematic plan view for describing a width of a thin plate portion (Part 1).
Figure 8:
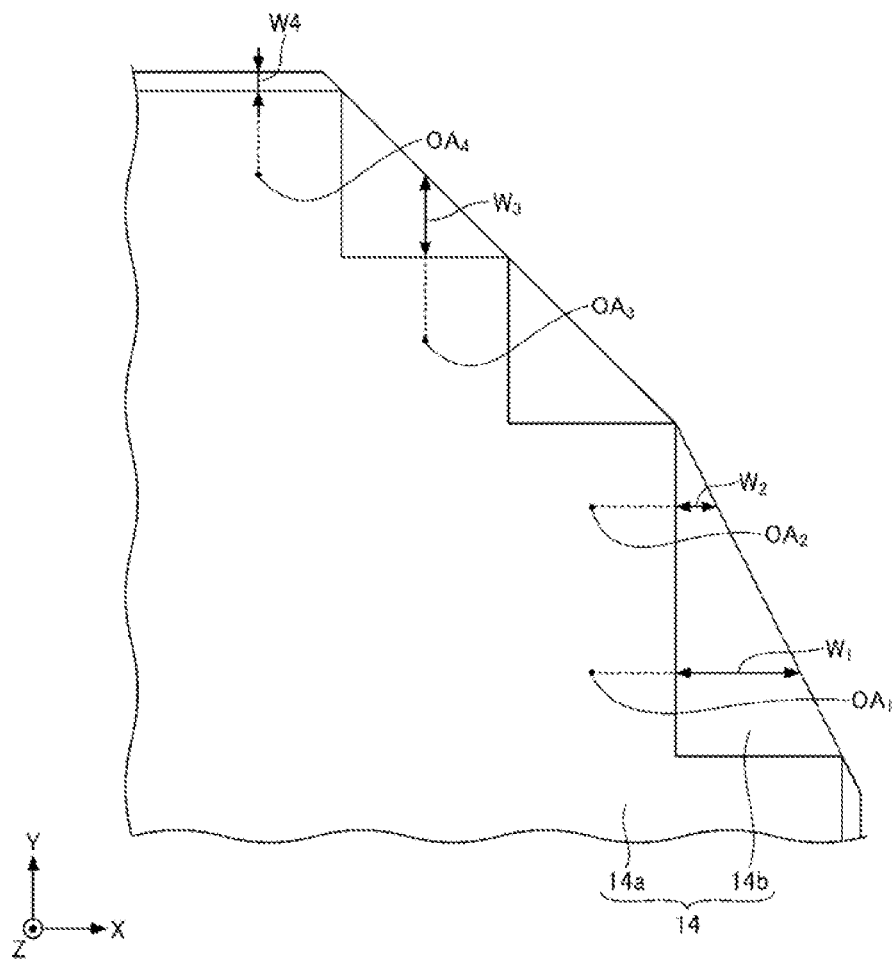
FIG. 8 is a schematic plan view for describing the width of the thin plate portion (Part 2).

In the planar light source 10, in a plan view, the greater the distance between the optical axis of a peripheral one of the light sources 12 in the X direction and a corresponding portion on the outer edge of the light diffusion plate 14 in the X direction, the greater the width of a corresponding portion of the thin plate portion 14b in the X direction. In FIG. 7, the structures under the light diffusion plate 14 (i.e., the substrate 11, the light sources 12, and the partition member 13) are illustrated with solid lines in order to better show these structures. For example, as illustrated in FIG. 7, the plurality of light sources 12 include one first distal-end light source $12_1$, which is an outermost one of the light sources in one of the first arrays of light sources 12 extending along the X direction, and another first distal-end light source $12_2$, which is an outermost one of the light sources in another of the first arrays of light sources 12 extending along the X direction, and a distance $L_1$ between an optical axis $OA_1$ of the one first distal-end light source $12_1$ and the outer edge of the light diffusion plate 14 in the X direction is greater than a distance $L_2$ between an optical axis $OA_2$ of the another first distal-end light source $12_2$ and the outer edge of the light diffusion plate 14 in the X direction. In this case, as illustrated in FIG. 8, in a plan view, a width $W_1$ of the thin plate portion 14b as measured along a straight line extending along the X direction from the optical axis $OA_1$ of the one first distal-end light source $12_1$ toward the outer edge of the light diffusion plate 14 is greater than a width $W_2$ of the thin plate portion 14b as measured along a straight line extending along the X direction from the optical axis $OA_2$ of the another first distal-end light source $12_2$ toward the outer edge of the light diffusion plate 14.

Further, in a plan view, the greater the distance between the optical axis of a distal-end light source 12 in the Y direction and a corresponding portion on the outer edge of the light diffusion plate in the Y direction, the greater the width of a corresponding portion of the thin plate portion 14b in the Y direction. For example, as illustrated in FIG. 7, the plurality of light sources 12 include one second distal-end light source $12_3$, which is an outermost one of the light sources in one of the second arrays of light sources 12 extending along the Y direction, and another second distal-end light source $12_4$, which is an outermost one of the light sources in another of the second arrays of light sources 12 extending along the Y direction, and a distance $L_3$ between an optical axis $OA_3$ of the one second distal-end light source $12_3$ and the outer edge of the light diffusion plate 14 in the Y direction is greater than a distance $L_4$ between an optical axis $OA_4$ of the another second distal-end light source $12_4$ and the outer edge of the light diffusion plate 14 in the Y direction. In this case, as illustrated in FIG. 8, in a plan view, a width $W_3$ of the thin plate portion 14b as measured along a straight line extending along the Y direction from the optical axis $OA_3$ of the one second distal-end light source $12_3$ toward the outer edge of the light diffusion plate 14 is greater than a width $W_4$ of the thin plate portion 14b as measured along a straight line extending along the Y direction from the optical axis $OA_4$ of the another second distal-end light source $12_4$ toward the outer edge of the light diffusion plate 14.

Figure 9:
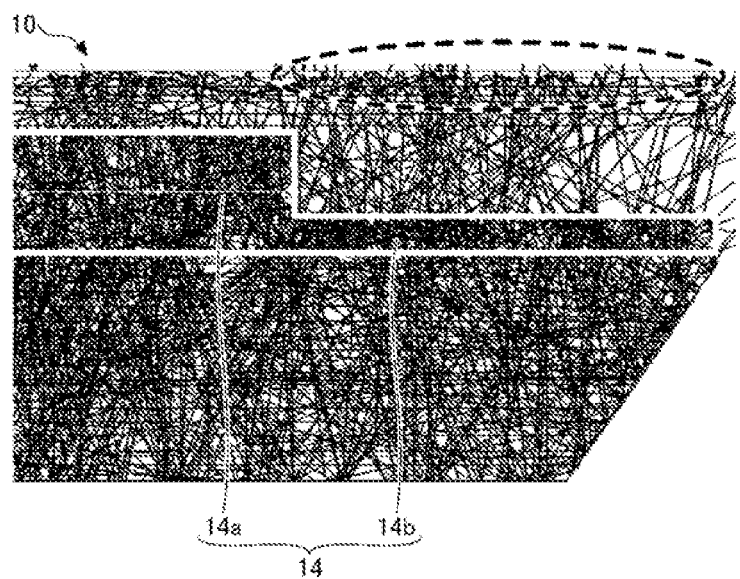
FIG. 9 is a diagram showing a simulation result for a light diffusion plate (Part 1).
Figure 10:
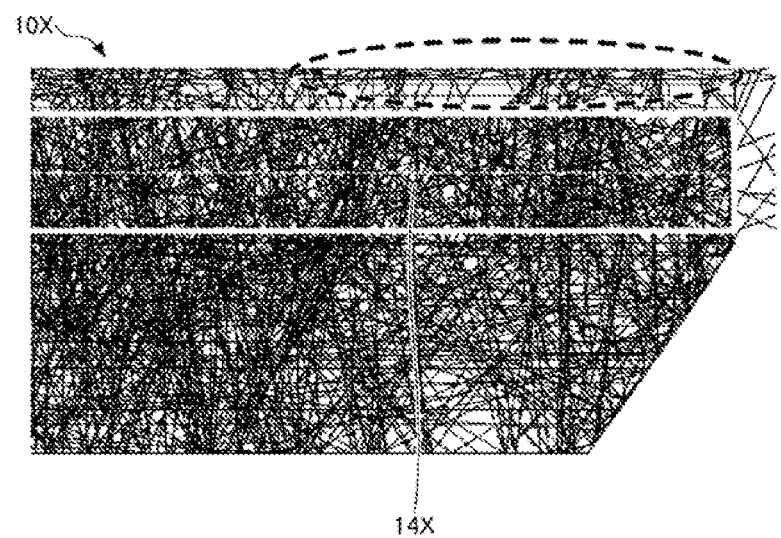
FIG. 10 is a diagram showing a simulation result for the light diffusion plate (Part 2).

FIGS. 9 and 10 are diagrams showing the results of simulations for the light diffusion plates. FIG. 9 shows the simulation result of the planar light source 10, and FIG. 10 shows the simulation result of a planar light source 10X provided with a light diffusion plate 14X having a constant thickness instead of the light diffusion plate 14 of the planar light source 10 (comparative example). In FIGS. 9 and 10, a large number of thin lines indicate light rays.

Comparing the portions surrounded by the broken lines in FIGS. 9 and 10, it can be confirmed that the planar light source 10 provided with the thin plate portion 14b has greater density of light rays, and allows better light extraction at the peripheral region of the light diffusion plate 14 than the planar light source 10X not provided with the thin plate portion. That is, it can be confirmed that the unevenness in the brightness of the light emitting surface at the peripheral region of the light diffusion plate 14 can be reduced. This is because providing the thin plate portion 14b to the light diffusion plate 14 allows for reducing the frequency of light diffusion at a location of the thin plate portion 14b, which allows for increasing the amount of light transmitted through the location of the thin plate portion 14b. This is also because light emitted from a lateral surface of the thick plate portion 14a exposed toward the thin plate portion 14b and light passed through the thin plate portion 14b and reflected on a lateral surface of the thick plate portion 14a propagate toward the upper surface side of the light diffusion plate, which allows for increasing the density of the light on the upper surface side of the light diffusion plate.

For the light diffusion plate 14, a simulation was performed with a thickness of the thick plate portion 14a set to 1.2 mm and a thickness of the thin plate portion 14b varied to 0.4 mm, 0.2 mm, and 0.1 mm, and then the brightness of the light transmitted through the thin plate portion 14b in a region of the thin plate portion 14b was calculated. As shown in Table 1, in a case in which the thin plate portion 14b was 0.4 mm, the brightness was increased by 1.1 times as compared with a case in which the thin plate portion 14b was 1.2 mm (that is, when the thin plate portion 14b had the same thickness as the thick plate portion 14a). Similarly, in a case in which the thin plate portion 14b was 0.2 mm, the brightness was increased by 1.12 times. Further, in a case in which the thin plate portion 14b was 0.1 mm, the brightness was increased by 1.17 times.

TABLE 1

| THICKNESS OF THIN PLATE PORTION 14b (mm) | BRIGHTNESS RATIO OF LIGHT TRANSMITTED THROUGH THIN PLATE PORTION 14b IN AREA OF THIN PLATE PORTION 14b |
|---|---|
| 1.2 | 1.00 |
| 0.4 | 1.10 |
| 0.2 | 1.12 |
| 0.1 | 1.17 |

Furthermore, when comparing the light leaking to the outside through a lateral surface of the light diffusion plate, it can be confirmed that the planar light source 10 provided with the thin plate portion 14b is less likely to leak the light compared to a case in which the planar light source 10X not provided with the thin plate portion is used. That is, in the planar light source 10, the light that would laterally leak in a conventional technique can be propagated to the upper surface side of the light diffusion plate 14. Accordingly, along with a reduction in the frequency of light diffusion in the thin plate portion 14b, the density of the light rays on the upper surface side of the thin plate portion 14b can be increased.

Further, in the planar light source 10, with the thin plate portion 14b disposed on the light diffusion plate 14, the amount of light leaking from the lateral surface of the light diffusion plate 14 can be reduced.

In the planar light source 10, a wavelength conversion sheet adapted to convert light from the light source 12 into light having a different wavelength can be disposed above the light diffusion plate 14. In the case in which the wavelength conversion sheet is disposed above the light diffusion plate 14, when light leaks from the lateral surface of the light diffusion plate, an end portion of the planar light source may be seen in the emission color (for example, blue) of the light emitting element 12a. However, in the planar light source 10, the light diffusion plate 14 includes the thin plate portion 14b, which allows for reducing the amount of light leaking from the lateral surface of the light diffusion plate 14, so that the phenomenon that the end portion of the planar light source 10 is seen in the emission color of the light emitting element 12a can be reduced. That is, when disposing the wavelength conversion sheet above the light diffusion plate 14, the phenomenon that light having a wavelength different from a wavelength resulting from conversion by the wavelength conversion sheet leaks to the outside through the lateral surface of the light diffusion plate 14 can be reduced.

As described above, in the planar light source 10, with the substrate 11 having the irregular shape, when as many light sources 12 as possible are placed on the substrate 11 while maintaining the matrix arrangement in the first direction and the second direction, there is a region near the outer edge of the substrate 11 where the light source 12 is not disposed. Then, when no measures are taken, for example, the region between the outermost periphery of the partition member 13 and the outer edge of the light diffusion plate 14 becomes a dark portion. That is, when no measures are taken, unevenness in brightness will occur in a part of the peripheral region of the planar light source 10. However, with the thin plate portion 14b located in the peripheral region of the light diffusion plate 14, light extraction is prioritized over light diffusion in the thin plate portion 14b. Accordingly, the frequency of light diffusion can be reduced, and the amount of light transmitted through the thin plate portion 14b can be increased. As a result, the occurrence of unevenness in brightness at the peripheral region of the planar light source 10 can be reduced.

The thin plate portion 14b can be provided in a portion where unevenness in brightness may occur, and thus the thin plate portion 14b need not be provided over the entire peripheral region of the light diffusion plate 14, and the thin plate portion 14b can be provided only in a part of the peripheral region of the light diffusion plate 14.

Figure 11:
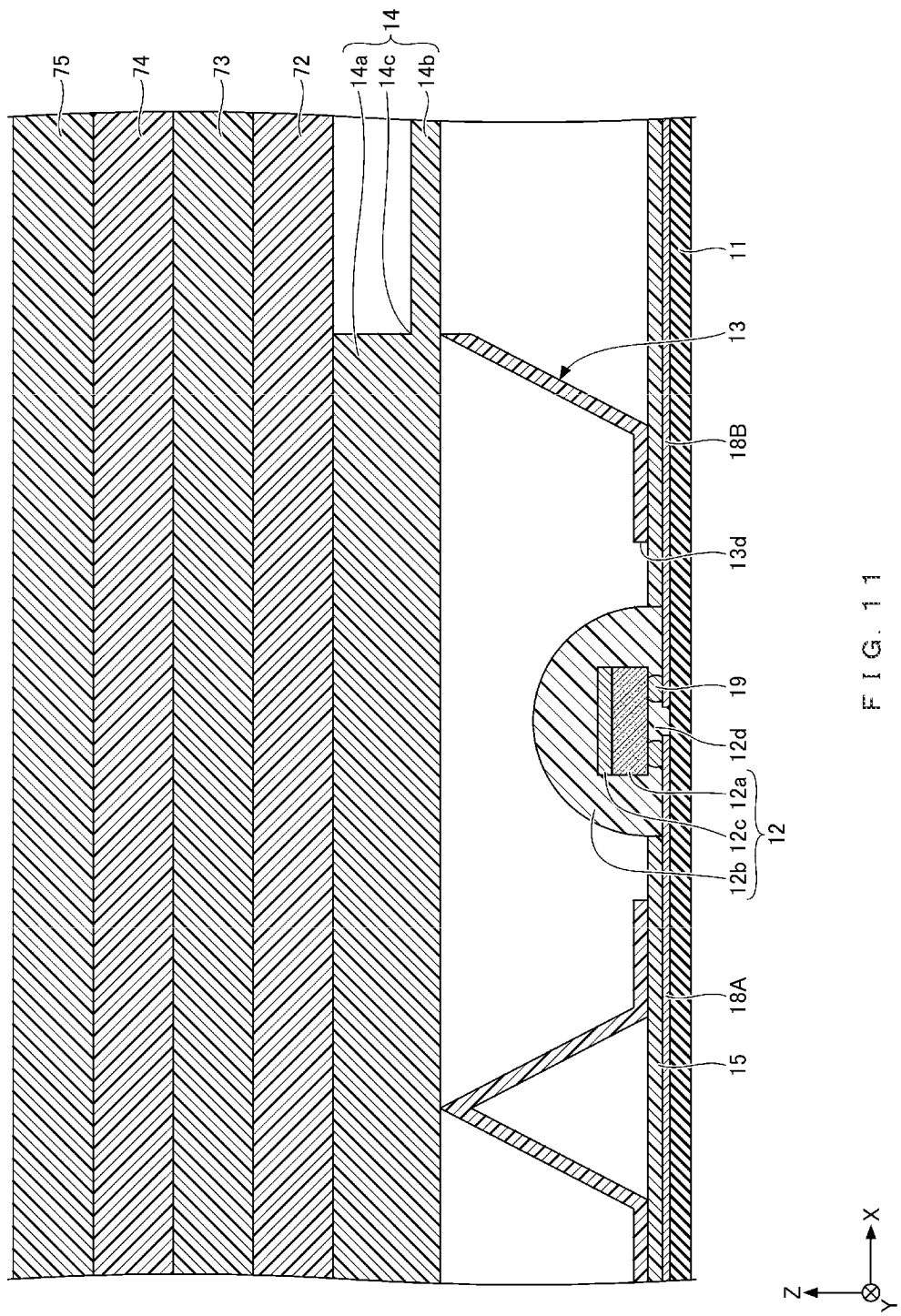
FIG. 11 is a schematic cross-sectional view illustrating an arrangement of optical members.

In addition, for the similar reason, in both the X direction and the Y direction, it is not necessary that the greater a distance between an optical axis of a distal-end light source 12 and a corresponding portion on the outer edge of the light diffusion plate 14, the greater the width of the thin plate portion 14b. That is, in at least one of the X direction and the Y direction, the greater the distance between the optical axis of a distal-end light source 12 and the outer edge of the light diffusion plate 14, the greater a width of the thin plate portion 14b The planar light source 10 can include, above the light diffusion plate 14, at least one type of sheet selected from the group consisting of a wavelength conversion sheet adapted to convert light from the light source 12 into light having a different wavelength, a prism sheet, and a polarizing sheet. More specifically, as illustrated in FIG. 11, optical members such as a wavelength conversion sheet 72, prism sheets (a first prism sheet 73 and a second prism sheet 74), a polarizing sheet 75, and the like can be disposed above the light diffusion plate 14 at a predetermined distance or directly or indirectly on the upper surface of the light diffusion plate 14, and a liquid crystal panel can be further disposed on the optical members, so that a surface emitting light emitting device to be used as a light source for a direct backlight can be obtained. The order of layering these optical members can be set as desired.

Wavelength Conversion Sheet 72

While the wavelength conversion sheet 72 can be disposed on either the upper surface or the lower surface of the light diffusion plate 14, as illustrated in FIG. 11, the wavelength conversion sheet 72 is preferably disposed on the upper surface of the light diffusion plate 14. The wavelength conversion sheet 72 is adapted to absorb a portion of light emitted from the light source 12 and emit light having a wavelength different from the wavelength of the light emitted from the light source 12. For example, the wavelength conversion sheet 72 is adapted to absorb a portion of blue light emitted from the light source 12 and emit yellow light, green light, and/or red light, so that the planar light source 10 adapted to emit white light can be obtained. The wavelength conversion sheet 72 is disposed spaced apart from the light emitting element 12a of the light source 12, so that a phosphor or the like having poor resistance to heat or light intensity, which is difficult to use in the vicinity of the light emitting element 12a, can be used for the wavelength conversion sheet 72. Consequently, the performance of the planar light source 10 as a backlight can be improved. The wavelength conversion sheet 72 has a sheet shape or a layered shape, and includes the phosphor or the like described above. The wavelength conversion sheet may be referred to as a wavelength conversion layer.

First Prism Sheet 73 and Second Prism Sheet 74

The first prism sheet 73 and the second prism sheet 74 have a shape in which a plurality of prisms extending in a predetermined direction are disposed in surfaces thereof. For example, when each of the first and second prism sheets 73 and 74 is viewed in two dimensions consisting of the X direction and the Y direction perpendicular to the X direction, the first prism sheet 73 can have a plurality of prisms extending along the Y direction, and the second prism sheet 74 can have a plurality of prisms extending along the X direction. The first prism sheet 73 and the second prism sheet 74 are configured to refract incident light, propagated in various directions, toward the display panel facing the planar light source 10. Accordingly, light emitted from the light emitting surface of the planar light source 10 can be emitted mainly in a direction perpendicular to the upper surface of the light emitting surface, and the brightness when the planar light source 10 is viewed in a front view can be increased.

Polarizing Sheet 75

For example, the polarizing sheet 75 is configured to selectively transmit light in a polarization direction that matches the polarization direction of a polarizing plate disposed proximate to the backlight of a display panel such as a liquid crystal display panel, and to reflect polarized light in a direction perpendicular to the polarization direction toward the first prism sheet 73 and the second prism sheet 74. A portion of the polarized light returned from the polarizing sheet 75 is reflected at the first prism sheet 73, the second prism sheet 74, the wavelength conversion sheet 72, and the light diffusion plate 14. At this time, the reflected light changes in the polarization direction, for example, is converted into polarized light having the polarization direction of the polarizing plate of the liquid crystal display panel, is again incident on the polarizing sheet 75, and is emitted to the display panel. Accordingly, the polarization direction of the light emitted from the planar light source 10 can be aligned, and light in the polarization direction effective for enhancing the brightness of the display panel can be emitted with high efficiency. For the polarizing sheet 75, the first prism sheet 73, the second prism sheet 74, and the like, commercially available optical members for backlights can be used.

In the planar light source 10, instead of providing the wavelength conversion sheet 72, the sealing member 12b can contain a wavelength conversion material such as phosphor adapted to absorb light emitted from the light emitting element 12a and to emit light having a wavelength different from that of the outputted light from the light emitting element 12a. With this structure, the sealing member 12b absorbs a portion of blue light emitted from the light source 12 and emits yellow light, green light, and/or red light, so that the planar light source 10 configured to emit white light can be obtained.

In addition to the wavelength conversion material, the sealing member 12b can contain a diffusing agent for diffusing light emitted from the light emitting element 12a, a coloring agent corresponding to the emission color of the light emitting element 12a, and the like. For the diffusing agent, the coloring agent, and the like, those known in the art can be employed. Further, instead of a structure in which the sealing member 12b contains the wavelength conversion material such as a phosphor, for example, a light emitting element 12a in which a nitride-based semiconductor is covered by a wavelength conversion material such as a phosphor, that is, the light emitting element 12a configured to emit white light can be used.

First Modified Example of First Embodiment

In the first modified example of the first embodiment, an example in which the cross-sectional shape of the thin plate portion of the light diffusion plate is different from that of the first embodiment will be illustrated. In description of the first modified example of the first embodiment, repetitive description of the same components as those of the embodiment described above may be omitted.

Figure 12:
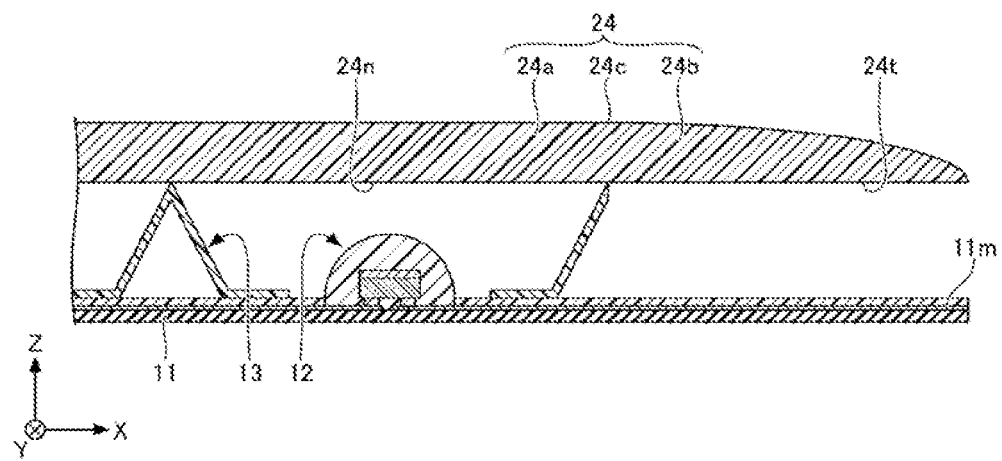
FIG. 12 is a schematic partially enlarged cross-sectional view illustrating a light diffusion plate of the planar light source according to a first modified example of the first embodiment (Part 1).
Figure 13:
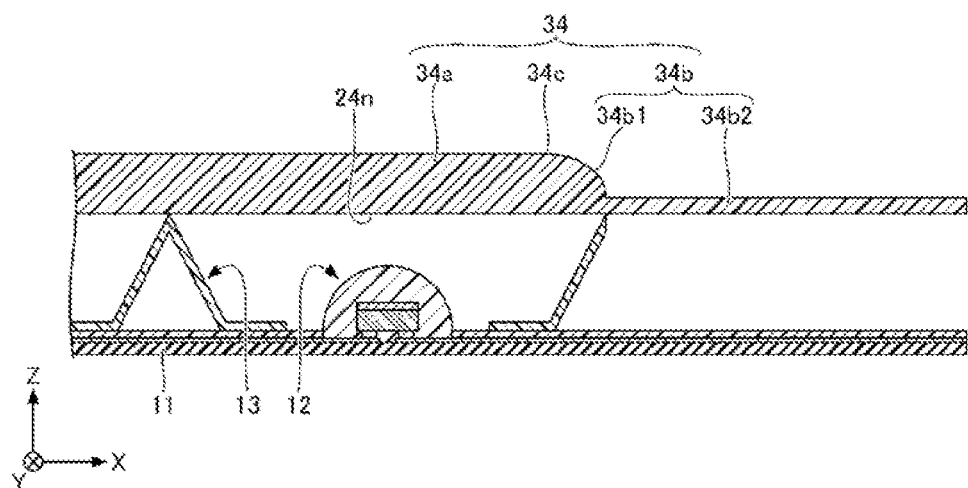
FIG. 13 is a schematic partially enlarged cross-sectional view illustrating a light diffusion plate of the planar light source according to the first modified example of the first embodiment (Part 2).
Figure 14:
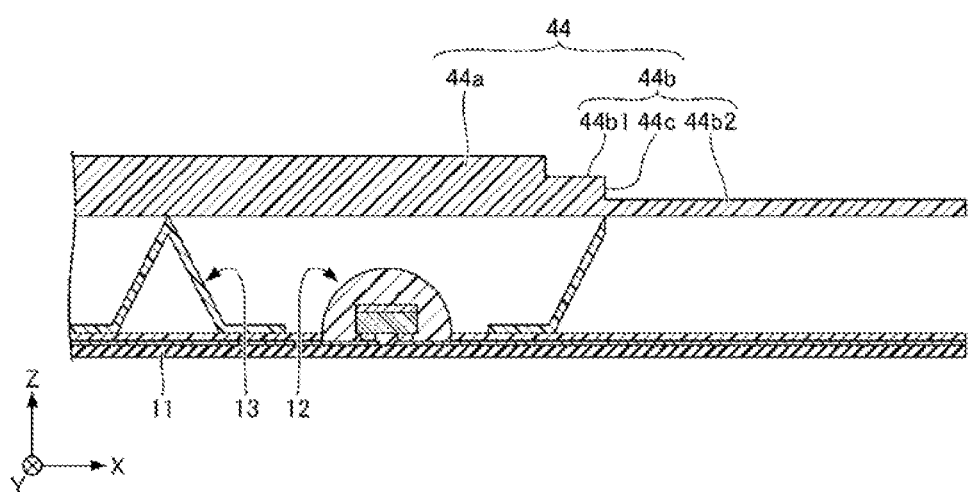
FIG. 14 is a schematic partially enlarged cross-sectional view illustrating a light diffusion plate of the planar light source according to the first modified example of the first embodiment (Part 3).
Figure 15:
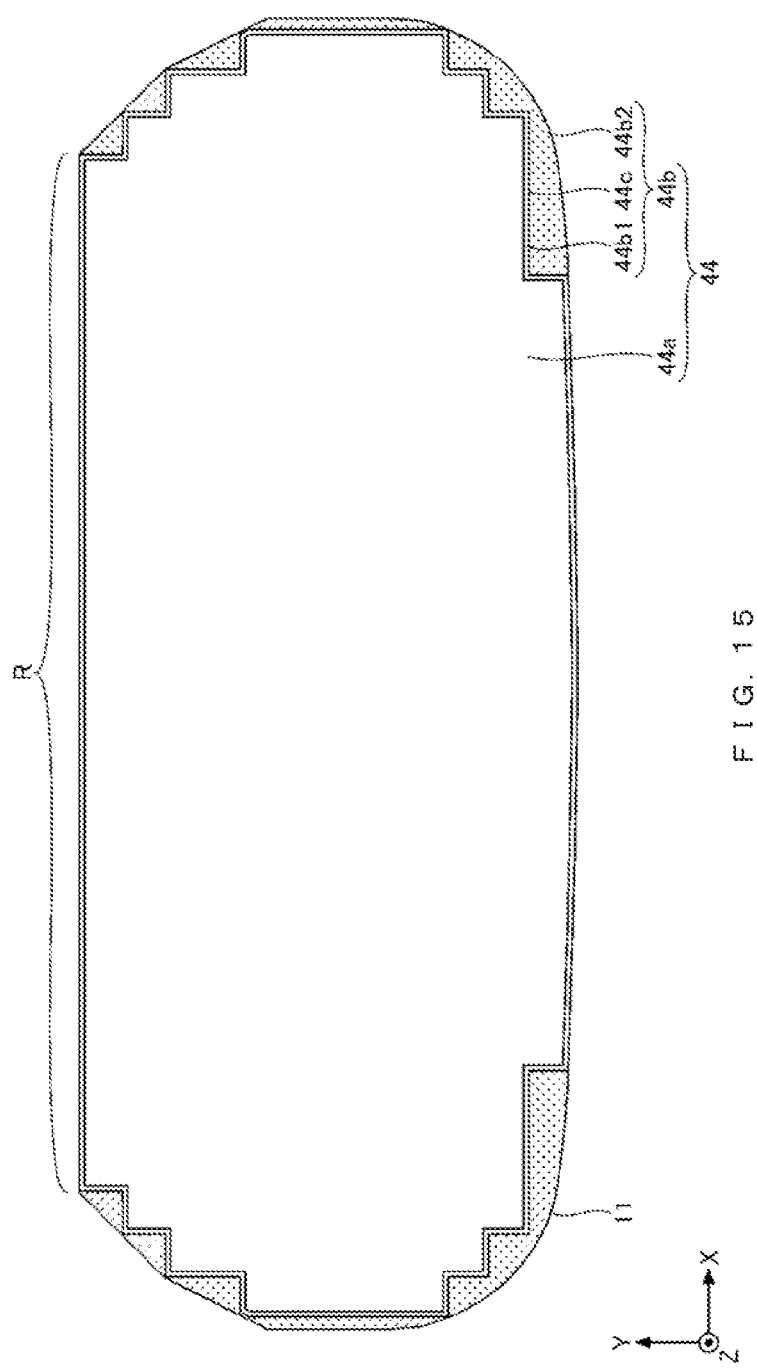
FIG. 15 is a schematic plan view illustrating the light diffusion plate of FIG. 14.

FIGS. 12 to 14 are schematic partially enlarged cross-sectional views illustrating different examples of light diffusion plates of the planar light source according to the first modified example of the first embodiment. FIG. 15 is a schematic plan view illustrating the light diffusion plate of FIG. 14.

In a light diffusion plate 24 illustrated in FIG. 12, the height from the upper surface 11m of the substrate 11 to a lower surface 24t of a thin plate portion 24b is the same as the height from the upper surface 11m of the substrate 11 to a lower surface 24n of a thick plate portion 24a. In addition, the thickness of the thin plate portion 24b gradually decreases from a boundary 24c with the thick plate portion 24a toward the outer edge of the light diffusion plate 24.

As described above, the boundary between the thick plate portion and the thin plate portion need not be stepped as illustrated in FIG. 3, and can have a shape in which the thickness varies smoothly as illustrated in FIG. 12. Also with this structure, in the thin plate portion 24b, light extraction can be prioritized over light diffusion. This allows for reducing the frequency of light diffusion, the amount of light transmitted through the thin plate portion 24b can be increased. Accordingly, the occurrence of unevenness in brightness at the peripheral region of the planar light source can be reduced.

Further, instead of the shape of the light diffusion plate 24 illustrated in FIG. 12, in which a thickness of the entire thin plate portion 24b is gradually decreased, the thin plate portion can have a shape having a portion in which the thickness gradually decreases from the boundary with the thick plate portion toward the outer edge of the light diffusion plate. For example, as in a light diffusion plate 34 illustrated in FIG. 13, a thin plate portion 34b can have a thickness gradually decreasing portion 34b1 in which the thickness gradually decreases from a boundary 34c with a thick plate portion 34a toward the outer edge of the light diffusion plate 34, and can further have a thickness constant portion 34b2 located closer to the outer edge of the light diffusion plate 34 than the thickness gradually decreasing portion 34b1. The thickness constant portion 34b2 has, for example, the same thickness as the thinnest portion of the thickness gradually decreasing portion 34b1.

Also, as in a light diffusion plate 44 illustrated in FIGS. 14 and 15, a thin plate portion 44b can have a first thin plate portion 44b1 on a thick plate portion 44a side, and a second thin plate portion 44b2, which is located closer to the outer edge of the light diffusion plate 44 than the first thin plate portion 44b1 and is thinner than the first thin plate portion 44b1. With such a two-step variation in thickness of the thin plate portion 44b, the brightness at the end portion of the planar light source can be increased. That is, because the greater the distance from the light source 12, the darker the portion would become, a structure in which the thickness of the light diffusion plate 14 is reduced in a direction in which the distance from the light source 12 increases allows for reduce the occurrence of unevenness in brightness at the peripheral region of the planar light source. The variation in the thickness of the thin plate portion 44b can be in more than two steps. Further, the thin plate portion 44b can have a cross-sectional shape in which the shapes illustrated in FIGS. 12 to 14 are appropriately combined.

The second thin plate portion 44b2 is disposed, for example, closer to the outer edge of the light diffusion plate 44 than the area where the through hole 13d of the partition member 13 is formed in a plan view. The second thin plate portion 44b2 can be disposed in the section C where the light source 12 is not disposed. The boundary 44c between the first thin plate portion 44b1 and the second thin plate portion 44b2 can be located at a position overlapping the top portion 13a of the partition member 13 in a plan view.

It is not always necessary to dispose both the first thin plate portion 44b1 and the second thin plate portion 44b2 over the entire peripheral region of the light diffusion plate 44, and a structure may be employed in which only the first thin plate portion 44b1 is disposed in a region where unevenness in brightness is not likely to occur. For example, in an area R in which the light sources 12 are linearly arranged in FIG. 15, unevenness in brightness is unlikely to occur, so that it is possible to dispose only the first thin plate portion 44b1 in the region R. Alternatively, when the unevenness in brightness hardly occurs in the region R in which the light sources 12 are linearly arranged in FIG. 15, the thin plate portion 44b need not be provided in the region R.

Second Modified Example of First Embodiment

In the second modified example of the first embodiment, an example is illustrated in which the partition member has sections having different sizes on its peripheral region. In description of the second modified example of the first embodiment, repetitive description of the same components as those of the above-described embodiment may be omitted.

Figure 16:
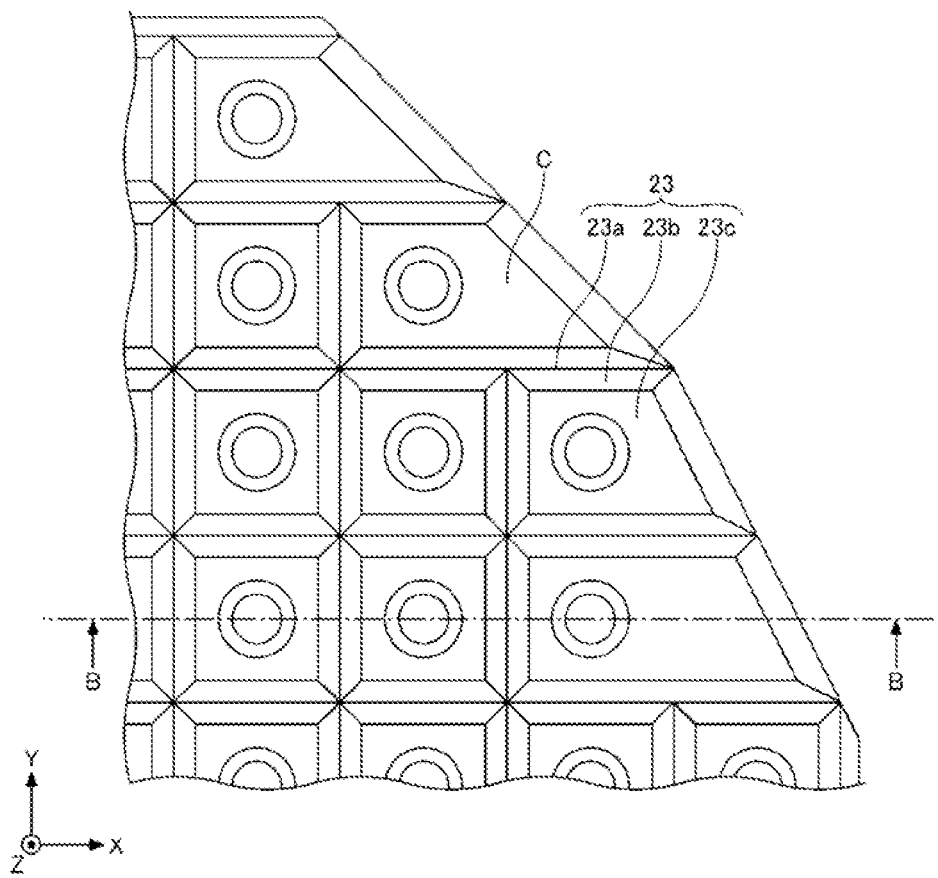
FIG. 16 is a schematic partially enlarged plan view of a partition member according to a second modified example of the first embodiment.
Figure 17:
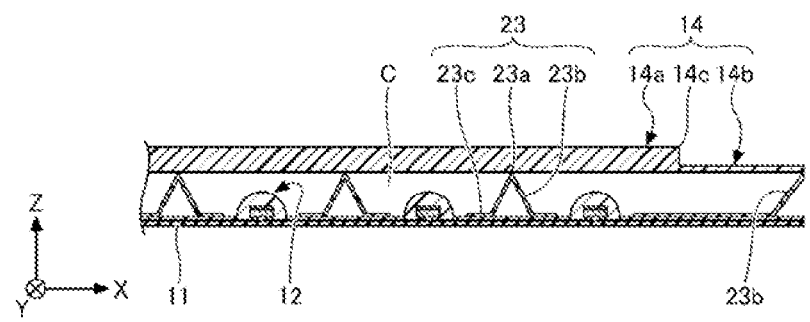
FIG. 17 is a cross-sectional view taken along line B-B of FIG. 16.

FIG. 16 is a schematic partially enlarged plan view of a partition member according to the second modified example of the first embodiment, FIG. 17 is a cross-sectional view taken along line B-B of FIG. 16. In a partition member 23 illustrated in FIGS. 16 and 17, portions of a top portion 23a and portions of a wall portion 23b, which constitute peripheral sections C of the plurality of sections C, are disposed in the vicinity of the outer edge of the substrate 11. That is, in at least one of the peripheral sections C, in a plan view, the area of the area surrounded by the wall portion 23b is larger than that of a section C inward of the peripheral sections C. While a region in a peripheral section C surrounded by a corresponding portion of the wall portion 23b the example of FIGS. 16 and 17 has an area dimension expanded in the X direction, such a region can have an area dimension expanded in the Y direction. Alternatively, the peripheral sections C may include both a peripheral section C in which a region surrounded by a corresponding portion of the wall portion 23b has an area dimension expanded in the X direction and a peripheral section C in which the area dimension of the region surrounded by a corresponding portion of the wall portion 23b of the peripheral section C is expanded in the Y direction.

As described above, while the area dimension of the bottom portions 23c each exposed in a respective section C are equal among all the sections C in a plan view in the example of FIGS. 2 and 3, other arrangement may alternatively be employed. As in the example of FIGS. 16 and 17, in a plan view, at least one of the regions surrounded by peripheral portions of the wall portion 23b located at the periphery of the partition member 23 can have an area dimension larger than that of the area dimension surrounded by a portion of the wall portion 23b located inward of the periphery of the partition member 23.

In the structure of the partition member 23 illustrated in FIGS. 16 and 17, portions of the wall portion 23b constituting a peripheral section C is located in the vicinity of the outer edge of the substrate 11, which allows for improving light extraction toward a light emitting surface. That is, in the structure of the partition member 23 illustrated in FIGS. 16 and 17, the wall portion 23b is also located on the peripheral region of the substrate 11, so that a greater amount of light can be transmitted to the thin plate portion 14b of the light diffusion plate 14. This can result in a reduction in the occurrence of unevenness in brightness at the peripheral region of the planar light source 10. However, the wall portion 23b needs not be provided on at least a part of the periphery of the partition member 23. While the wall portion 23b of the partition member is not disposed at the boundary between the thick plate portion 14a and the thin plate portion 14b of the light diffusion plate 14 in the example in FIGS. 16 and 17, the wall portion 23b can be provided at this position.

Third Modified Example of First Embodiment

In the third modified example of the first embodiment, modified examples of the members other than the light diffusion plate and the partition member are illustrated. In the description of the third modified example of the first embodiment, repetitive description of the same components as those of the above-described embodiment may be omitted.

Figure 18A:
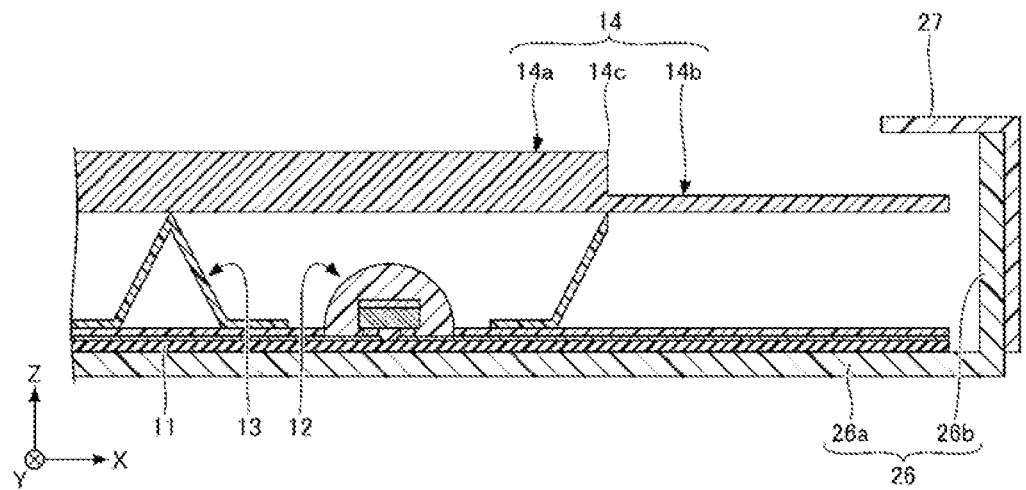
FIG. 18A is a schematic partially enlarged cross-sectional view in the vicinity of an outer edge of the planar light source (Part 1).

FIG. 18A is a schematic partially enlarged cross-sectional view in the vicinity of the outer edge of the planar light source. As illustrated in FIG. 18A, the planar light source can have a frame body 26 surrounding the substrate 11 and the light diffusion plate 14. The frame body 26 has an irregular shape such as a shape similar to that of the substrate 11, and includes a bottom portion 26a that is a little larger than the substrate 11 in a plan view and a lateral wall 26b.

A peripheral region of the bottom portion 26a is annularly exposed to the outside of the substrate 11, and the lateral wall 26b is located in the exposed portion of the bottom portion 26a to surround the substrate 11. A cover 27 surrounding the outer edges of the substrate 11 and the light diffusion plate 14 can be disposed on the side opposite to the bottom portion 26a with respect to the lateral wall 26b. The cover 27 is disposed at a position that does not block the light emitted from each of the light sources 12. The frame body 26 and the cover 27 can be formed of various materials such as resins containing a reflective material, metals, and ceramics.

Figure 18B:
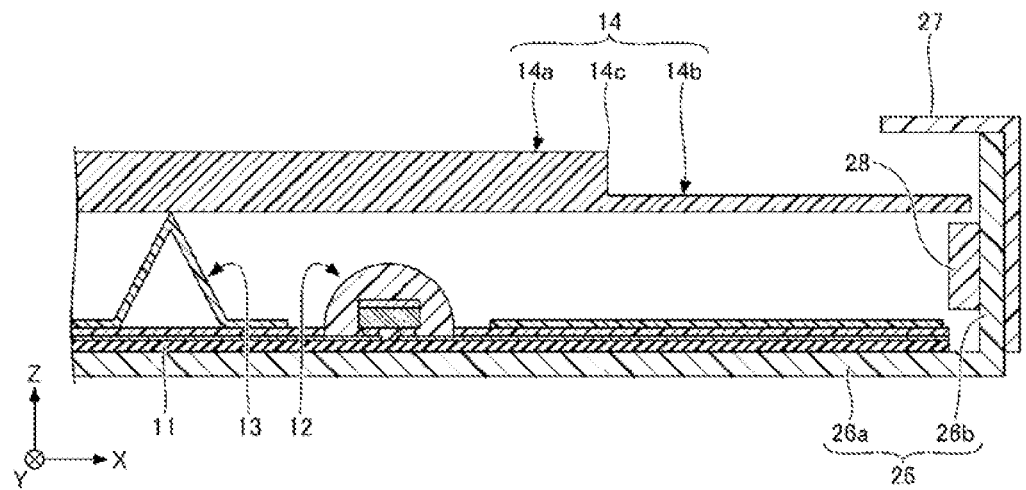
FIG. 18B is a schematic partially enlarged cross-sectional view in the vicinity of the outer edge of the planar light source (Part 2).

As illustrated in FIG. 18B, a wavelength conversion member 28 containing a phosphor can be disposed in a region between the substrate 11 and the light diffusion plate 14 on inner lateral surfaces of the lateral wall 26b. With this structure, a wavelength of a portion of light emitted from the light source 12 is converted by the wavelength conversion member 28 disposed on the inner lateral surfaces of the lateral wall 26b, and the wavelength converted light is extracted. Therefore, the phenomenon that the end portion of the planar light source 10 is seen in an emission color of the light emitting element can be reduced. When the wavelength conversion member 28 is disposed on the inner lateral surfaces of the lateral wall 26b, in the cross-sectional view of the planar light source, the wall portion 13b of the partition member 13 may or may not be disposed between the light source 12 and the lateral wall 26b. The wavelength conversion member 28 can be disposed on the entire inner lateral surfaces of the lateral wall 26b or can be disposed on the inner lateral surfaces of the lateral wall 26b in a region below the lower surface of the light diffusion plate 14. When the wavelength conversion member 28 is disposed in the region below the lower surface of the light diffusion plate 14, the thin plate portion 14b of the light diffusion plate 14 may or may not cover the upper part of the wavelength conversion member 28. For the wavelength conversion member 28, a material that emits yellow light (for example, YAG) can be used. One wavelength conversion member 28 or a plurality of wavelength conversion members 28 can be disposed on the inner lateral surfaces of the lateral wall 26b.

With the frame body 26 and the cover 27 are provided in the planar light source in this arrangement, the substrate 11 and the light diffusion plate 14 can be protected from external impact or the like. The light diffusion plate 14, the substrate 11, and the frame body 26 can have similar irregular shapes.

FIG. 19 is a schematic plan view explaining an outer shape of a substrate of the planar light source according to the third modified example of the first embodiment, and illustrates only the substrate, the light sources, and the partition member. The shape of the light diffusion plate can be, for example, the same shape as that of FIG. 5. A substrate 21 of a planar light source 20 illustrated in FIG. 19 has an irregular shape without a region where the light source 12 is not disposed as compared with the substrate 11 illustrated in FIG. 1. That is, the substrate 21 has an outermost shape corresponding to the outermost shape of the partition member 13. In the example of FIG. 19, the substrate 21 is located at a position overlapping with the partition member 13 (the lower side of the partition member 13) in a plan view.

As described above, the substrate 21 to be used for the planar light source can have a shape without a region where the light source 12 is not disposed. In this case as well, using the light diffusion plate 14 having the same shape as that of FIG. 5 allows for decreasing the frequency of light diffusion at the peripheral region of the light diffusion plate 14, so that light to be transmitted through the light diffusion plate 14 can be increased. This can result in reduction in occurrence of unevenness in brightness at the peripheral region of the planar light source.

The cross-sectional shape of the planar light source 20 can be a linear shape parallel to the XY plane as illustrated in FIG. 11 and the like, or can be a curved shape with respect to the XY plane. For example, the cross-sectional shape of the planar light source 20 can be a curved shape in which the light emitting surface is recessed in the X direction.

Second Embodiment

For a second embodiment, an example of a liquid crystal display device using the planar light source according to the first embodiment as a backlight source will be illustrated. In description of the second embodiment, repetitive description of the same components as those of the embodiment described above may be omitted.

Figure 20:
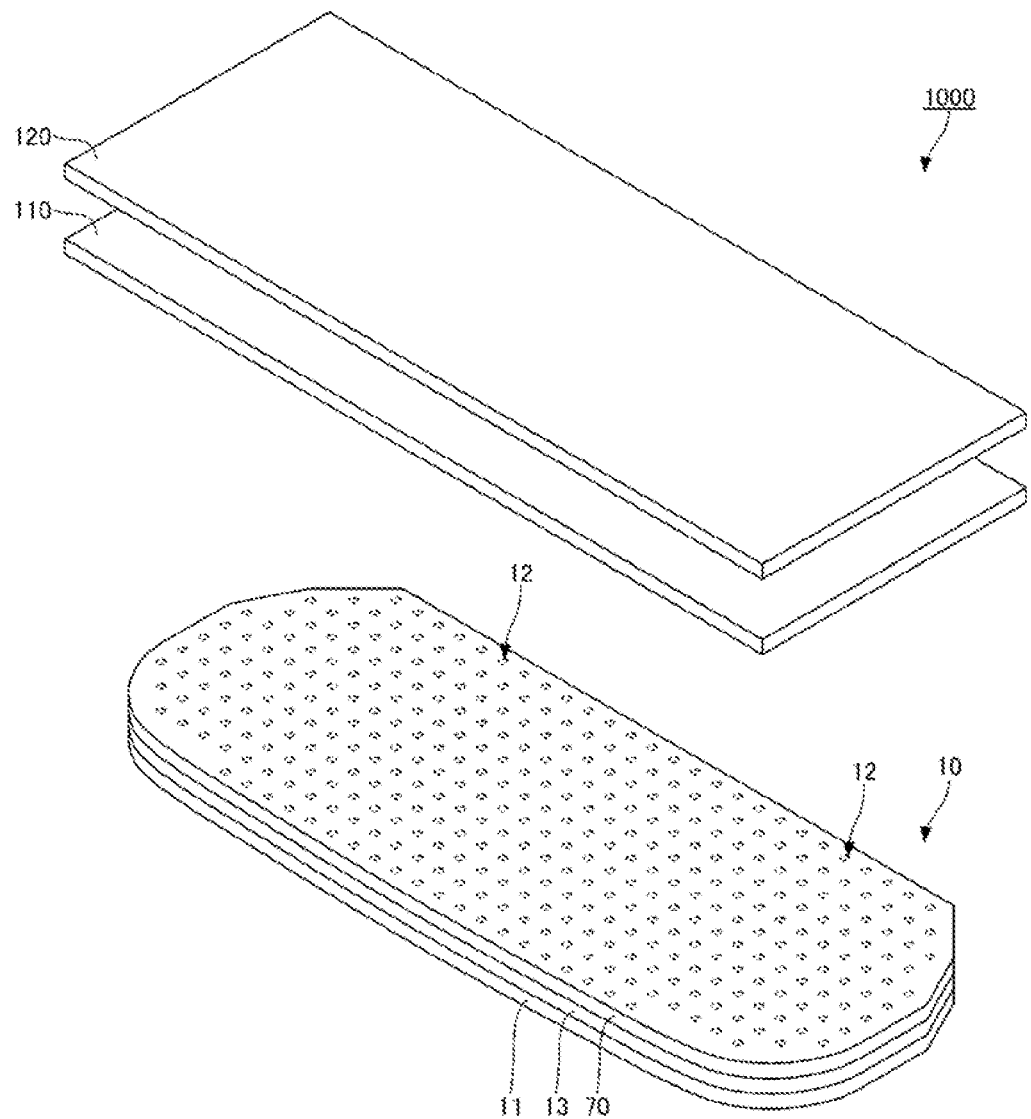
FIG. 20 is a configuration diagram illustrating a liquid crystal display device according to a second embodiment.

FIG. 20 is a configuration diagram illustrating a liquid crystal display device according to the second embodiment. As illustrated in FIG. 20, a liquid crystal display device 1000 includes a liquid crystal panel 120, an optical sheet 110, and the planar light source 10 according to the first embodiment in this order from the upper side. In the planar light source 10, a reference sign 70 denotes the optical members such as the light diffusion plate and the wavelength conversion sheet. In the example herein, the optical sheet 110 can be provided with a reflective polarizer film (DBEF), a brightness enhancement film (BEF), a color filter, or the like, in addition to or instead of some of the optical members.

The liquid crystal display device 1000 is a so-called direct-lit liquid crystal display device in which the planar light source 10 is layered below the liquid crystal panel 120. In the liquid crystal display device 1000, the liquid crystal panel 120 is irradiated with light emitted from the planar light source 10. In addition to the above-described constituent members, a member such as a color filter can be further provided.

In general, in a direct liquid crystal display device, since the distance between the liquid crystal panel and the planar light source is short, the uneven color and the unevenness in the brightness of the planar light source can affect the uneven color and unevenness in the brightness of the liquid crystal display device. Therefore, as a planar light source for a direct liquid crystal display device, a planar light source having less uneven color and unevenness in brightness is desired. Using the planar light source 10 for the liquid crystal display device 1000 allows for reducing the unevenness in brightness to be generated on the peripheral region and reducing the overall unevenness in brightness and emission color while reducing the thickness of the planar light source 10 to 5 mm or less, 3 mm or less, 1 mm or less, or the like.

The number of the planar light source 10 used as the backlight for a single liquid crystal display device 1000 may be other than one, and a plurality of arranged planar light sources 10 can be used for the backlight for one liquid crystal display device 1000. For example, producing a plurality of small planar light sources 10 and performing inspection or the like on each of them allows for improving the yield compared with a case of producing a single large planar light source 10 a large number of light sources 12 are mounted.

As described above, the planar light source 10 is configured to emit uniform light from the optical member 70, and thus is preferable for use as a backlight for the liquid crystal display device 1000.

The planar light source 10 can also be preferably used as a backlight devices for televisions, tablets, smartphones, smart watches, head-up displays, digital signage, bulletin boards, and the like. In addition, the planar light source 10 can also be used as a light source for lighting, and can also be used for emergency lights, linear lighting, various illuminations, vehicle instrument panels, and the like. One or more modifications illustrated in the first to third modified examples of the first embodiment can be applied to the planar light source 10.

While certain embodiments and the like have been described in detail above, the present invention is not limited to the embodiments and the like described above, various modifications and substitutions can be made to the embodiments and the like described above without departing from the scope described in the claims.

For example, in the embodiment described above, the example in which the lower surface of the thick plate portion of the light diffusion plate (the surface proximate to the light source) and the lower surface of the thin plate portion of the light diffusion plate (surface proximate to the light source) are on the same plane. However, the upper surface of the thick plate portion of the light diffusion plate (a surface on a side opposite to a side where the light source is disposed) and the upper surface of the thin plate portion (a surface on the side opposite to the side where the light source is disposed) can be in the same plane. That is, the light diffusion plate can be thinned on its lower surface side to obtain the thin plate portion. For example, the light diffusion plate can have an inverted shape of the light diffusion plate 14 illustrated in FIG. 6, the light diffusion plate 24 illustrated in FIG. 12, the light diffusion plate 34 illustrated in FIG. 13, and the light diffusion plate 44 illustrated in FIG. 14. In these cases, while it cannot be expected that the light from a lateral surface of the thick plate portion toward the upper surface side of the light diffusion plate will increase, the frequency alight diffusion in the thin plate portion can be decreased and the amount of light transmitted through the thin plate portion can be increased, so that a certain effect of reducing unevenness in brightness of the light emitting surface at the peripheral region of the light diffusion plate can be obtained.

Also, the light diffusion plate can contain scattered particles such as titanium oxide particles or phosphor particles, and the concentration of scattered particles contained in the thin plate portion can be less than the concentration of scattered particles contained in the thick plate portion. Consequently, the frequency of light diffusion in the thin plate portion can be further reduced and light transmitted through the thin plate portion can be further increased, so that the effect of reducing unevenness in the brightness of the light emitting surface at the peripheral region of the light diffusion plate can be improved. Alternatively, in a case in which a scattered particle layer containing scattered particles is disposed on an upper surface and/or a lower surface of the light diffusion plate, and the concentration of scattered particles in the scattered particle layer disposed on the thin plate portion is less than the concentration of scattered particles in the scattered particle layer disposed on the thick plate portion, a similar effect can be obtained.

What is claimed is:

1. A planar light source comprising:
   a mounting substrate;
   a plurality of light sources arranged two-dimensionally on the mounting substrate in a plan view;
   a partition member including a wall portion surrounding each of the light sources except for outermost ones of the light sources in the plan view, and wall portions being located inward of the outermost ones of the light sources;
   a frame body having a bottom portion and a lateral wall surrounding the mounting substrate;
   a wavelength conversion member disposed on the lateral wall of the frame body; and
   a light diffusion plate disposed above the plurality of light sources and the wavelength conversion member.

2. The planar light source according to claim 1, wherein a distance between an outermost light source among the plurality of light sources and the lateral wall is greater than a distance between the outermost light source and a top portion of a corresponding wall portion of the partition member.

3. The planar light source according to claim 1, wherein a top end of the wavelength conversion member is located lower than or at a same height as a top end of the partition member with respect to the mounting substrate.

4. The planar light source according to claim 1, wherein the partition member includes a bottom portion connected to a lower end of the wall portion located between the light sources.

5. The planar light source according to claim 4, wherein the partition member further includes a bottom portion located outward of the outermost light source.

6. The planar light source according to claim 1, wherein the lateral wall of the frame body is perpendicular to an upper surface of the mounting substrate.

7. The planar light source according to claim 1, wherein the light diffusion plate has a thickness that is thinner in a region between the outermost light source and the lateral wall than in other regions.

8. A planar light source comprising:
a mounting substrate;
a plurality of light sources arranged two-dimensionally on the mounting substrate in a plan view;
a frame body having a bottom portion and a lateral wall surrounding the mounting substrate;
a wavelength conversion member disposed on the lateral wall of the frame body, wherein a distance between the wavelength conversion member and an outermost light source among the plurality of light sources is greater than a distance between two light sources among the plurality of light sources; and
a light diffusion plate disposed above the plurality of light sources and the wavelength conversion member.

9. The planar light source according to claim 8, wherein the lateral wall of the frame body is perpendicular to an upper surface of the mounting substrate.

10. The planar light source according to claim 8, wherein the light diffusion plate has a thickness that is thinner in a region between the outermost light source and the lateral wall than in other regions.

\* \* \* \* \*